United States Patent
Schwenk et al.

(10) Patent No.: US 10,596,666 B2
(45) Date of Patent: Mar. 24, 2020

(54) COUPLING SYSTEM FOR USE WITH A SPINDLE APPARATUS OF A MACHINE TOOL

(71) Applicant: SAUER GmbH, Stipshausen (DE)

(72) Inventors: Gaston Schwenk, Simmern (DE); Jens Ketelaer, Wiesbaden (DE)

(73) Assignee: SAUER GMBH, Stipshausen (DE)

( * ) Notice: Subject to any disclaimer, the term of this patent is extended or adjusted under 35 U.S.C. 154(b) by 462 days.

(21) Appl. No.: 15/267,933

(22) Filed: Sep. 16, 2016

(65) Prior Publication Data

US 2017/0080537 A1   Mar. 23, 2017

(30) Foreign Application Priority Data

Sep. 18, 2015   (DE) .................. 10 2015 218 030

(51) Int. Cl.
*B23P 23/04* (2006.01)
*B23B 37/00* (2006.01)
(Continued)

(52) U.S. Cl.
CPC ............ *B23Q 1/0009* (2013.01); *B23B 37/00* (2013.01); *B23K 26/0093* (2013.01); *B23K 26/14* (2013.01); *B23K 26/1462* (2015.10); *B23K 26/34* (2013.01); *B23K 26/342* (2015.10); *B23P 23/04* (2013.01); *B23Q 5/043* (2013.01); *H02J 50/10* (2016.02); *B23Q 3/155* (2013.01);
(Continued)

(58) Field of Classification Search
CPC .................. B23Q 1/0009; B23B 37/00; G05B 2219/50245

USPC ............................................. 307/104; 483/39
See application file for complete search history.

(56) References Cited

U.S. PATENT DOCUMENTS 4,536,661 A * 8/1985 McMurtry ........... B23Q 1/0009
                                                                  307/119
5,791,836 A * 8/1998 Feufel .................. B23Q 1/0009
                                                                  408/124
(Continued)

FOREIGN PATENT DOCUMENTS

CN              204658046 U  *  9/2015
DE    10 2005 011 197 A1       9/2006
(Continued)

OTHER PUBLICATIONS

Machine Translation of CN 204658046 U, which CN '046 was published Sep. 2015.*
(Continued)

*Primary Examiner* — Erica E Cadugan
(74) *Attorney, Agent, or Firm* — Seed Intellectual Property Law Group LLP

(57) ABSTRACT

The present invention relates to a coupling system for use at a spindle apparatus of a machine tool, comprising an energy transmission unit with a transmitter coil unit for the contact-free transmission of electrical energy to a receiver coil unit of a tool interface unit with an electrical load and a tool interface portion for accommodation in a tool support of a work spindle of the spindle apparatus, and a coupling interface unit having an interface body element attachable to the spindle apparatus and a second coupling element which is configured to be coupled to a first coupling element of the energy transmission unit by means of a releasable connection.

21 Claims, 13 Drawing Sheets

(51) Int. Cl.
*B23K 26/342* (2014.01)
*H02J 50/10* (2016.01)
*B23Q 1/00* (2006.01)
*B23K 26/14* (2014.01)
*B23K 26/00* (2014.01)
*B23Q 5/04* (2006.01)
*B23K 26/34* (2014.01)
*B23Q 3/155* (2006.01)
*B23Q 3/157* (2006.01)

(52) U.S. Cl.
CPC .................. *B23Q 2220/008* (2013.01); *G05B 2219/50245* (2013.01); *Y10T 29/5107* (2015.01); *Y10T 409/309296* (2015.01); *Y10T 483/17* (2015.01)

(56) References Cited

U.S. PATENT DOCUMENTS

| | | | |
|---|---|---|---|
| 8,044,822 B2 | 10/2011 | Hoerl et al. | |
| 2006/0258521 A1* | 11/2006 | Bryan | B23B 31/261 483/13 |
| 2008/0180279 A1* | 7/2008 | Hoerl | B23Q 1/0009 340/870.31 |
| 2013/0322889 A1* | 12/2013 | Graf | B23Q 1/0009 398/141 |

| | | | |
|---|---|---|---|
| 2015/0273638 A1 | 10/2015 | Ketelaer | |
| 2015/0314410 A1 | 11/2015 | Feucht | |
| 2016/0107244 A1 | 4/2016 | Feucht et al. | |
| 2016/0184941 A1 | 6/2016 | Kao et al. | |

FOREIGN PATENT DOCUMENTS

| | | | |
|---|---|---|---|
| DE | 102007024503 B3 * | 8/2008 |
| DE | 10 2012 219 254 A1 | 4/2010 |
| DE | 10 2009 008 227 A1 | 8/2010 |
| DE | 10 2012 222 360 A1 | 6/2014 |
| DE | 10 2013 210 199 A1 | 12/2014 |
| DE | 10 2013 224 649 A1 | 6/2015 |
| DE | 202019103076 U1 * | 7/2019 |
| EP | 1 856 705 B1 | 4/2009 |
| EP | 2 837 463 A1 | 2/2015 |
| JP | 01-177948 A * | 7/1989 |
| JP | 5-208349 A | 8/1993 |
| JP | 2004-1107 A | 1/2004 |
| JP | 2008-533706 A | 8/2008 |
| TW | M499978 U | 5/2015 |
| WO | 2014/013247 A2 | 1/2014 |
| WO | 2014/086926 A1 | 6/2014 |

OTHER PUBLICATIONS

Machine Translation of DE 102007024503-B3, which DE '503 was published Aug. 2008.*

* cited by examiner

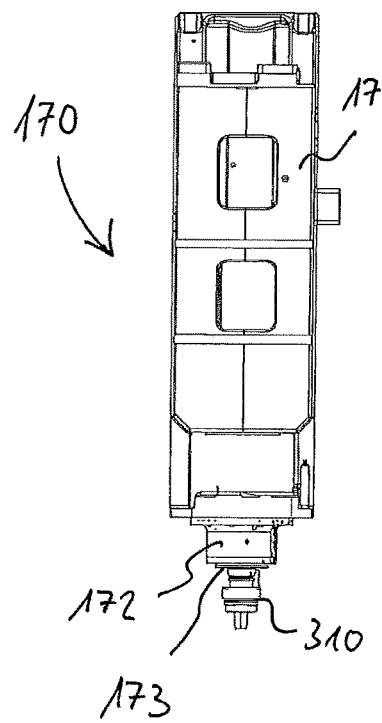
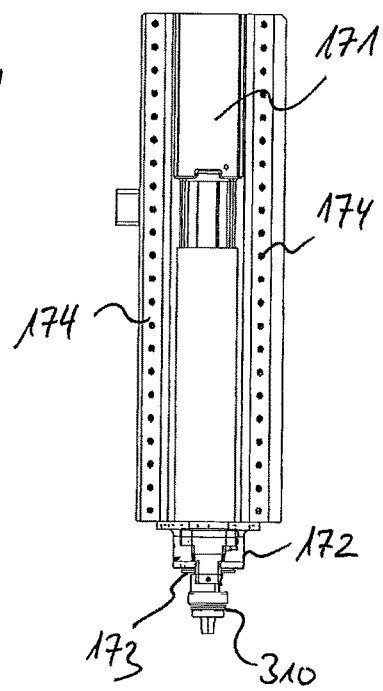
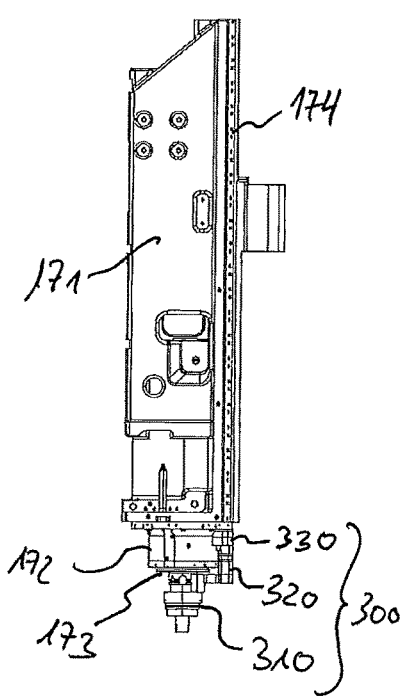
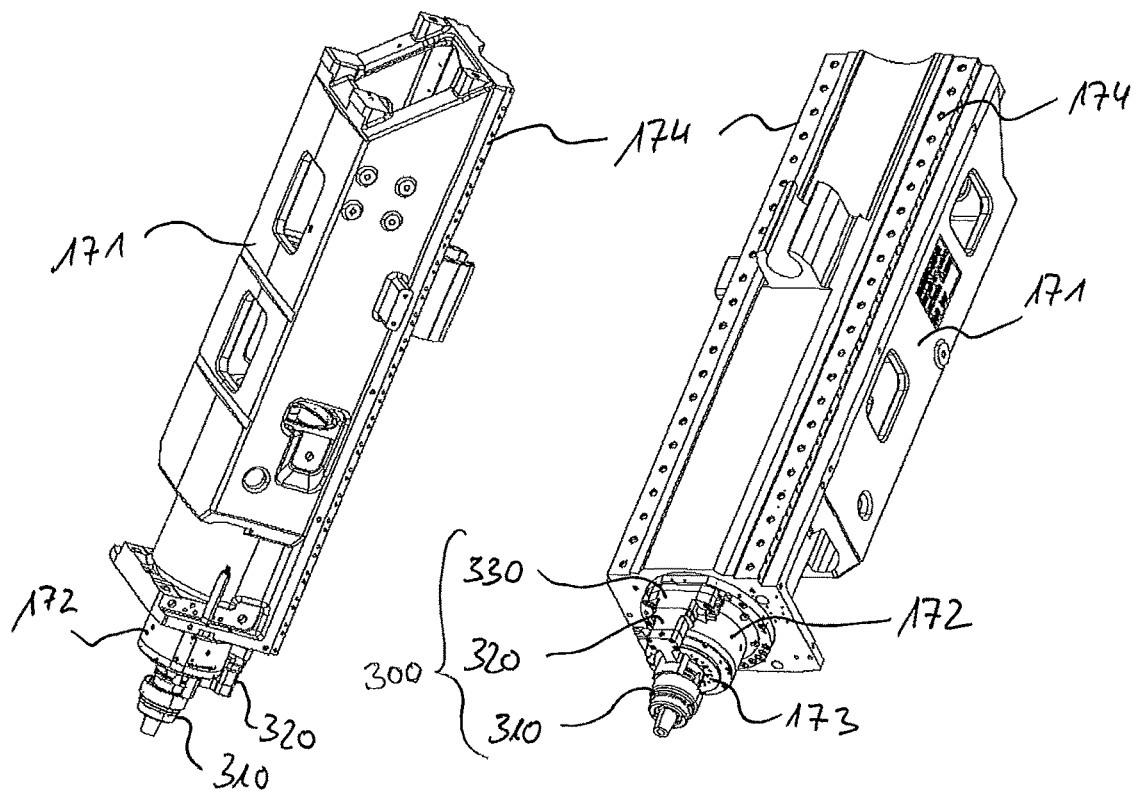

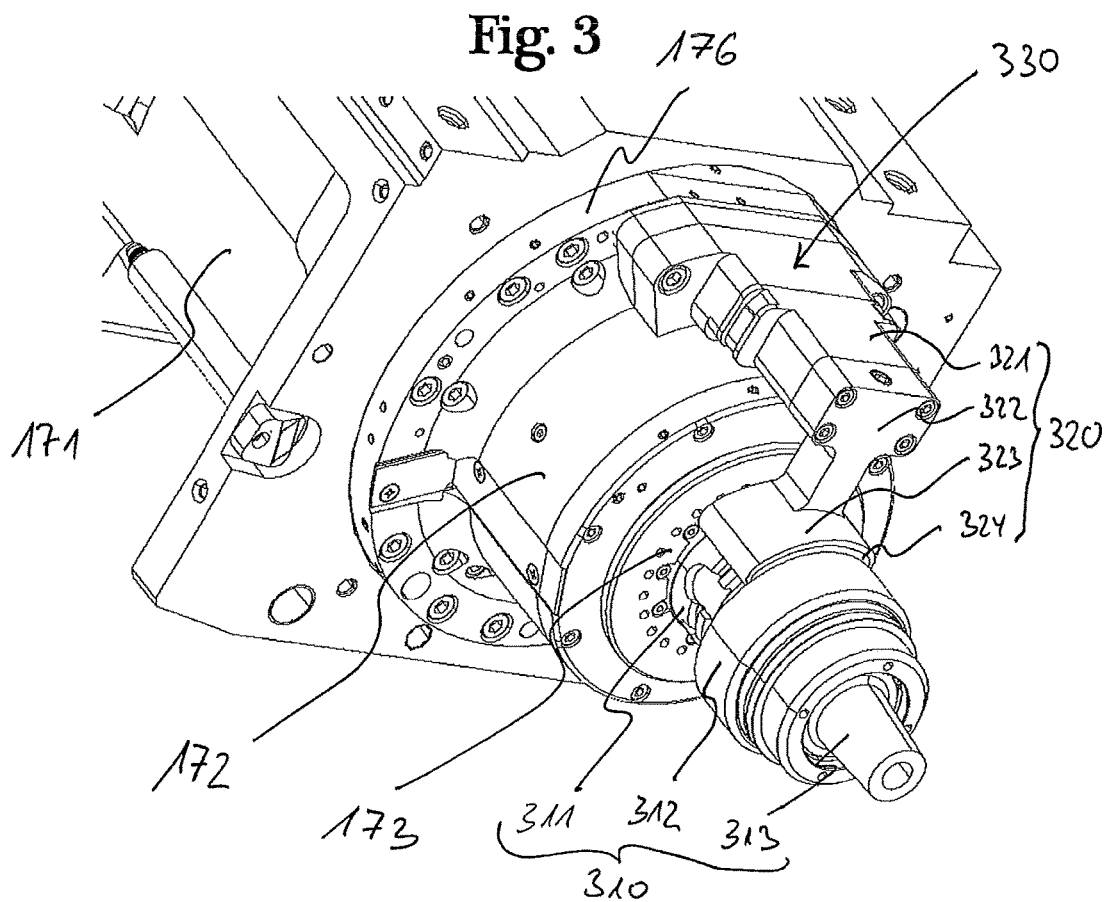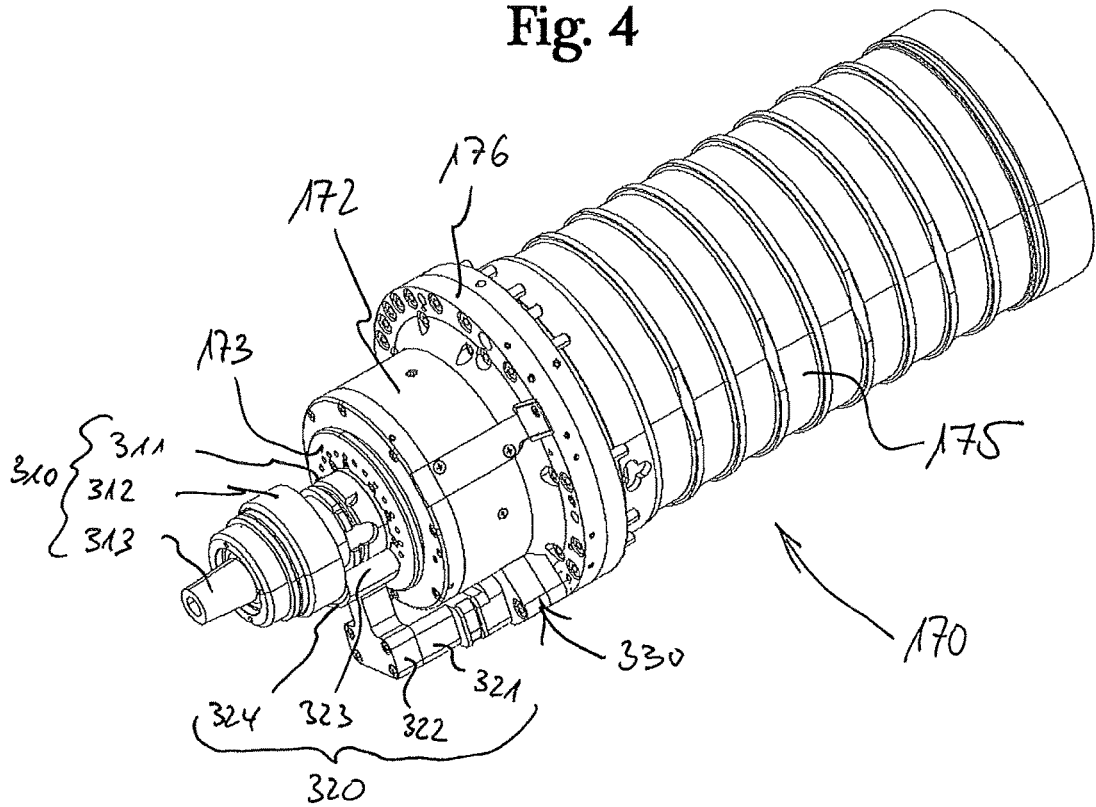

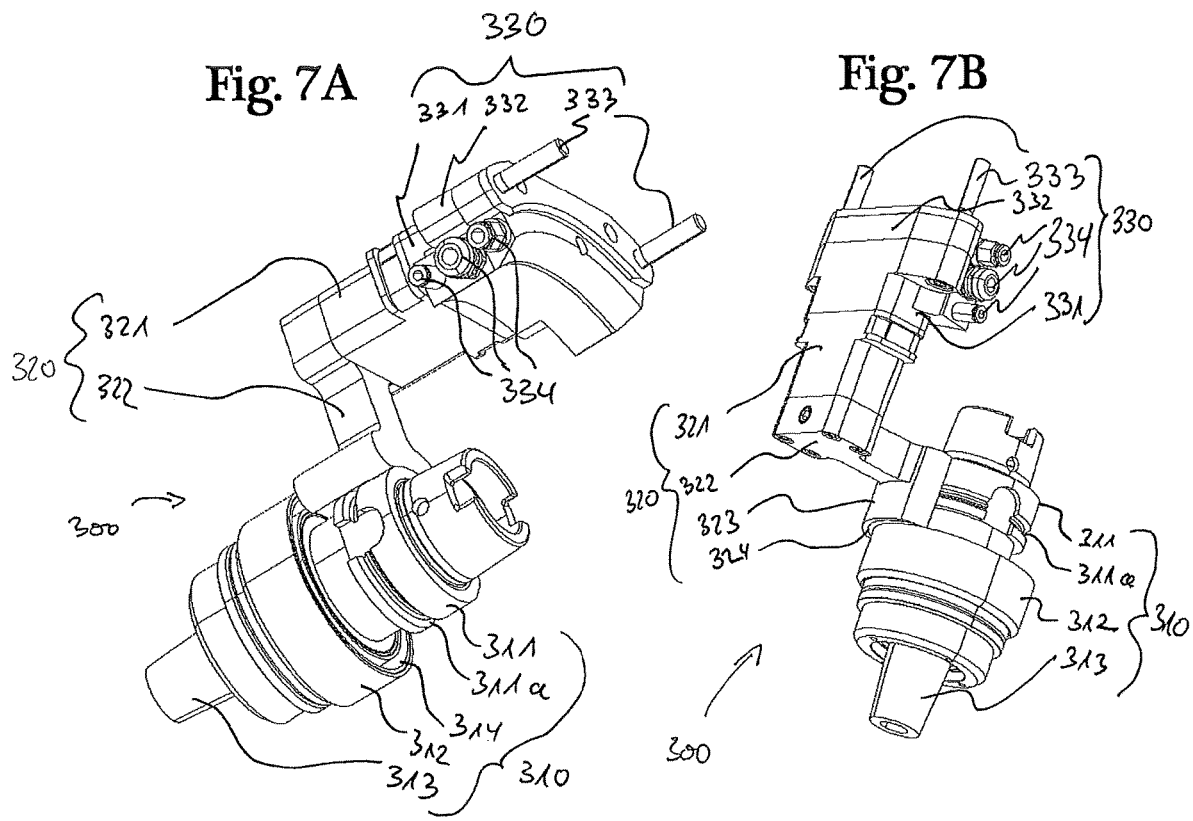
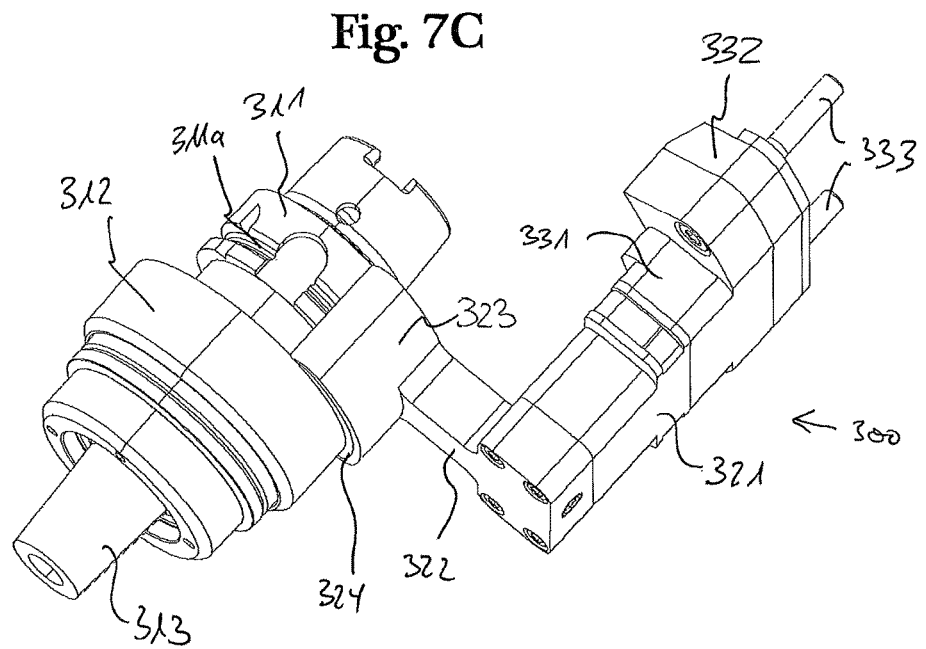

COUPLING SYSTEM FOR USE WITH A SPINDLE APPARATUS OF A MACHINE TOOL

BACKGROUND

Technical Field

The present application relates to a system and/or coupling system for use with a spindle apparatus of a machine tool.

Description of the Related Art

The prior art discloses machine tools which can be used for both a material-removing processing and a material-depositing processing of a workpiece.

DE 10 2013 224 649 A1 describes a machine tool having a machine control, a machine frame, a workpiece table, a tool support preferably made in accordance with a standard, a plurality of translational and/or rotational axes for adjusting a relative position between workpiece table and tool support, a tool magazine for one or more material-removing, in particular machining, tools, a tool change mechanism for automatically moving tools between tool support and tool magazine, a deposition welding head that can be inserted into the tool support and a storage device for storing the deposition welding head outside the tool support.

WO 2014/013247 A2 describes a machine tool which is configured to conduct an energy source through a processing head to a workpiece, the machine tool having a clamping mechanism to accommodate the processing head or another processing head at times in order to process a workpiece. The processing head has one or more conduction mechanisms which are configured to direct the energy source to a workpiece, and a processing head support device where the processing head can be supplied with one medium or several media when used in order to make possible the processing of the workpiece, the processing head support device allowing to supply the medium or the media to the processing head when the processing head is connected to the clamping mechanism. The machine tool also has at least one mechanism which is configured to connect a supply support device to the processing head support device in such a way that when both support devices are connected the medium is supplied to the processing head.

An advantage for special machining types or special materials employed is when the processing head used for this processing is additionally supplied with energy on the outer side thereof. Due to the different dimensions of the various processing heads, the problem arises that when a processing head for a machining operation is replaced with a processing head for deposition welding, the device for the energy supply, which is required for the processing head for the machining operation but not for the processing head for deposition welding, stands in the way of the processing head for deposition welding so as to prevent an exchange of the two processing heads.

An object of the present invention is to provide a versatile, space-saving and cost-effective tool interface system or coupling interface system for machine tools, which can favorably be used in a particularly space-saving and cost-effective way and with favorably synergetic effects with respect to the advantageous energy and signal transmission and/or supply and to beneficially efficient, time-saving and versatile tool change possibilities and accurate tool and processing head alignment, in particular when hybrid machine tools are employed where optionally in addition to a conventional machining operation further processing possibilities can be combined, such as tool interface units which have electrical loads and which are used e.g., in ultrasonic processing, and/or in combination with material deposition processing heads for depositing material on the machine tool usually operating to remove material.

Therefore, a further object of the present invention is to provide a coupling system for a machine tool by means of which different tool interfaces or processing heads can be accommodated alternately at the same processing head support, as a result of which both a material-removing or machining workpiece processing and a material-depositing workpiece processing, e.g., deposition welding, can be carried out in an efficient, cost-effective and space-saving way without any limitations.

BRIEF SUMMARY

According to an aspect of the invention, a system for use in a spindle apparatus of a machine tool and/or a coupling interface unit for use in such a system are proposed in order to achieve the above mentioned object.

An aspect of the invention proposes a system for use at a spindle apparatus of a machine tool.

The system can comprise an energy transmission unit having a transmitter coil unit for the contact-free transmission of electrical energy to a receiver coil unit of a tool interface unit. The tool interface unit can have the receiver coil unit, an electrical load and/or a tool interface portion to accommodate the tool interface unit at a tool support of a work spindle of the spindle apparatus. Where appropriate, it is also possible to provide a plurality of energy transmission units having different dimensions for a plurality of tool interface units having different dimensions, a respective coupling element of the energy transmission units being preferably made in equal fashion for the purpose of coupling to a single coupling interface unit.

The system can have a coupling interface unit having an interface body element mounted on the spindle apparatus and a second coupling element, the second coupling element being preferably configured to be coupled to a first coupling element of the energy transmission unit/s by means of a releasable connection.

According to a preferred exemplary embodiment, the first and second coupling elements can preferably have in each case one or more plug connection elements, preferably in such a way that the one or more plug connection elements of the first coupling element and the one or more plug connection elements of the second coupling element are configured to establish a releasable plug connection for the releasable attachment of the first coupling element to the second coupling element.

According to a preferred exemplary embodiment, the first and second coupling elements can preferably have respectively connectable electric contact segments, preferably for the production of an electric connection between the first and second coupling elements, when the first coupling element is releasably attached to the second coupling element.

According to a preferred exemplary embodiment, the first coupling element can preferably have electrical wirings which electrically connect the transmitter coil unit of the energy transmission unit preferably to the electric contact segments of the first coupling element.

According to a preferred exemplary embodiment, the second coupling element can preferably have electrical wirings which electrically connect the electrical contact segments of the second coupling element preferably to electrical connection elements arranged at the interface body element of the coupling interface unit for the connection of external electrical wirings.

According to a preferred exemplary embodiment, the coupling interface unit can preferably have an electrically, hydraulically and/or pneumatically controllable locking mechanism for unlocking and/or locking the releasable attachment between the first and second coupling elements.

According to a preferred exemplary embodiment, the coupling interface unit can preferably have electrical, hydraulic and/or pneumatic connection elements that are arranged on the interface body element in order to control the locking mechanism.

According to a preferred exemplary embodiment, the interface body element of the coupling interface unit can preferably be attachable to the spindle apparatus by means of a screw connection.

According to a preferred exemplary embodiment, the system can also comprise additionally or alternatively a coupling element holder which can be attached to the machine tool and has a coupling element support for holding the energy transmission unit when the first coupling element of the energy transmission unit is uncoupled from the second coupling element of the coupling interface unit.

According to a preferred exemplary embodiment, the system can additionally or alternatively have a coupling element adapter having a third coupling element which is preferably configured to be coupled, preferably analogously to the first coupling element of the energy transmission unit, to the second coupling element of the coupling interface unit by means of a releasable connection when the first coupling element of the energy transmission unit is uncoupled from the second coupling element of the coupling interface unit.

According to a preferred exemplary embodiment, the third and second coupling elements can preferably have in each case one or more plug connection elements, preferably in such a way that the one or more plug connection elements of the third coupling element are configured, preferably with the one or more plug connection elements of the second coupling element, to establish a releasable plug connection for the releasable attachment of the third coupling element to the second coupling element.

According to a preferred exemplary embodiment, the third coupling element can preferably have an attachment element on the side opposite the plug connection elements for the plug connection to the second coupling element, for the releasable attachment to a further attachment element which is preferably attachable to a material deposition processing apparatus that can be accommodated at the tool support of the work spindle of the spindle apparatus.

According to a preferred exemplary embodiment, the system can additionally or alternatively comprise the tool interface unit with the receiver coil unit.

According to a preferred exemplary embodiment, the tool interface unit can preferably have a tool support portion on a side opposite the tool interface portion in order to accommodate a tool.

According to a preferred exemplary embodiment, the tool interface unit can preferably have as an electrical load a vibration drive which is preferably configured to drive an oscillation of the tool interface unit, in particular preferably within the ultrasonic frequency range.

A further aspect of the invention proposes a coupling interface unit for use in an above described system for use with a spindle apparatus of a machine tool. The coupling interface unit preferably comprises an interface body element which can be mounted on the spindle apparatus and a second coupling element which is configured to be coupled to a first coupling element of an energy transmission unit of the system by means of a releasable connection.

A further aspect of the invention proposes an energy transmission unit for use in an above described system for use at a spindle apparatus of a machine tool. The energy transmission unit preferably comprises a transmitter coil unit for the contact-free transmission of electrical energy to a receiver coil unit of a tool interface unit which includes the receiver coil unit, an electrical load and a tool interface portion for accommodating the tool interface unit at a tool support of a work spindle of the spindle apparatus and/or a first coupling element which is configured to be coupled to a second coupling element of a coupling interface unit of the system by means of a releasable connection.

Further additional aspects of the present invention are proposed: a spindle apparatus for use on a machine tool, on which a coupling interface unit is mounted according to the above described aspect or a coupling interface unit of an above described system, and a machine tool having such a spindle apparatus.

In summary, a versatile, space-saving and cost-effective tool interface system and/or coupling interface system for machine tools is provided which can be used in a particularly space-saving and cost-effective way with favorably synergetic effects with respect to the advantageous energy and signal transmission and/or supply and to advantageously efficient, time-saving and versatile tool change possibilities and accurate tool and processing head alignment, in particular when used for hybrid machine tools where optionally in addition to a conventional machining operation further processing possibilities can be combined, such as tool interface units which have electrical loads and which are used e.g., in the ultrasonic processing, and/or in connection with material deposition processing heads serving to deposit material on the machine tool which conventionally removes material.

BRIEF DESCRIPTION OF THE DRAWINGS

FIGS. 2A to 2E show exemplary embodiments of a spindle carrier slide according to an embodiment of the invention;

FIG. 3 shows an exemplary perspective detailed view of a tool support of a work spindle according to an embodiment of the invention;

FIG. 4 shows an exemplary perspective view of a spindle apparatus according to an embodiment of the invention;

FIGS. 7A to 7C show exemplary perspective detailed views of a tool coupling system according to an embodiment of the invention;

DETAILED DESCRIPTION

Figure 1:
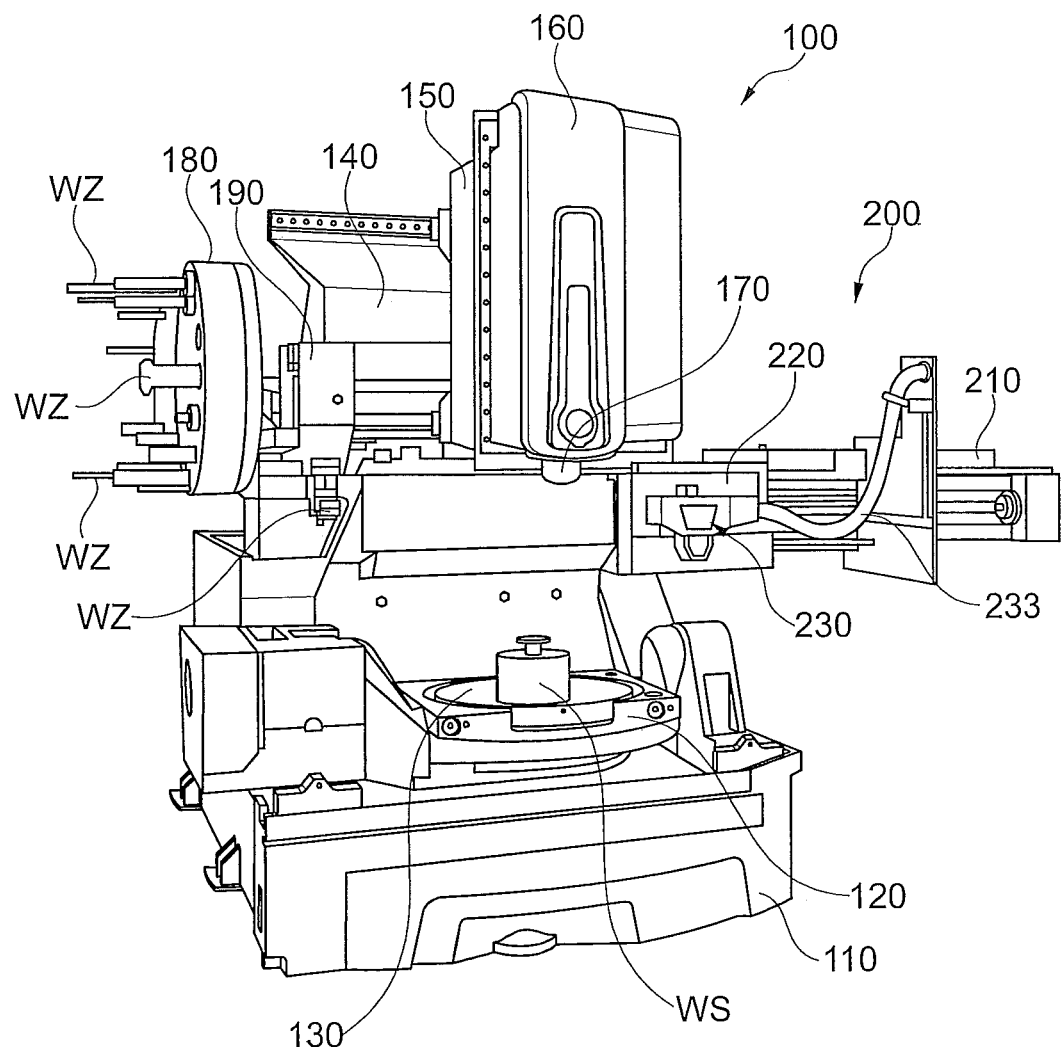
FIG. 1 shows an exemplary perspective view of a machine tool according to an embodiment of the invention.

Examples and embodiments of the present invention are specified below with reference to the enclosed drawings. Equal or similar elements in the drawings can here be designated with equal reference signs, and sometimes also with different reference signs. It is pointed out that the present invention is by no means limited or restricted to the below embodiments and embodiment features thereof but also comprises modifications of the embodiments, in particular those included by modifications of the features of the described examples and/or by combining individual or several features of the described examples on the basis of the scope of the independent claims.

FIG. 1 shows an exemplary perspective view of a machine tool 100 according to an embodiment of the invention.

As an example, the machine tool 100 comprises a machine bed 110, on which e.g., a swivel table 120 is arranged which has a rotary table 130, which is rotatably mounted on the swivel table 120 and on which e.g., a workpiece WS is clamped for processing on the machine tool 100.

As an example, the machine tool 100 comprises two rotationally controllable axes for rotating the workpiece WS clamped on the rotary table 130, e.g., about a swivel axis which is horizontally aligned in relation to the machine bed 110 and about which the swivel table 120 can be swiveled on the machine bed 110, and about an axis of rotation which is vertically aligned in relation to the swivel table 120 and about which the rotary table 130 can be rotated on the swivel table 120.

In this exemplary embodiment, the axis of rotation of the rotary table 130 is not absolutely stationary in relation to the machine bed 110 but swivels when the swivel table 120 swivels. In further embodiments of the invention, it is possible to provide only one, more than two or also no rotary and/or swivel axes. In further embodiments it is also possible to provide independent swivel and/or rotary axes, e.g., in that a rotary axis and/or swivel axis rotates the workpiece and another rotary axis and/or swivel axis rotates the tool and/or the spindle head.

As an example, the machine tool 100 also comprises an axis slide assembly having a first axis slide 140 which is arranged on a rear machine column of the machine bed 110 and is guided on longitudinal axis slide guides mounted on the machine column. On the longitudinal axis slide guides, the first axis slide 140 is e.g., linearly movable horizontally in the direction of an X-axis of the machine tool 100 (in FIG. 1 in a direction aligned horizontally from the front to the rear).

On the front side of the first axis slide 140, e.g., horizontally aligned transverse axis slide guides are arranged on which a second axis slide 150 can travel in linear fashion e.g., in the direction of an Y-axis of the machine tool 100 e.g., horizontally and transversely or perpendicularly to the direction of the X-axis of the first axis slide 140 (in FIG. 1 in a direction aligned horizontally from left to right).

The front side of the second axis slide 150 holds a spindle head having a spindle head housing 160. The spindle head can e.g., travel linearly in vertical fashion e.g., in the direction of a Z-axis of the machine tool 100, i.e., in particular e.g., in each case transversely and/or perpendicularly to the directions of the X-axis and Y-axis.

A work spindle of a spindle apparatus 170 is arranged on the bottom side of the spindle head with the spindle head housing 160 and the spindle axis thereof is aligned e.g., vertically and in particular e.g., parallel to the direction of the Z-axis.

In the embodiment according to FIG. 1, three independently controllable linear axes are thus provided as an example (e.g., controllable by a control device (not shown) on a numerical machine tool control, optionally with CNC control unit and/or PLC control unit, optionally on the basis of NC programs and/or control commands inputted manually via a control panel of the machine tool 100). As an example, all three linear axes can move independently from one another or simultaneously the tool received on the work spindle of the spindle apparatus 170 in active fashion in relation to the position of the workpiece WS clamped on the rotary table 130.

In further embodiments, it is also possible to provide one, two or more than three independently movable linear axes and/or it is also possible to provide one, two, three or more linear axes for moving the workpiece and/or the rotary table 130 and/or the swivel table 120.

Furthermore, the machine tool 100 comprises e.g., a tool magazine 180 which is configured to supply a plurality of tools, tool interfaces and/or tools with tool interfaces. For example, the tool magazine 180 is made as a chain magazine, however, other types of tool magazines can also be provided, such as shelf magazines or wheel-type magazines, etc.

In addition, the machine tool 100 comprises e.g., a tool change apparatus 190 linearly movable between a tool change position of the work spindle of the spindle apparatus 170 and a tool removal position and/or tool insertion position of the tool magazine 180. The tool change apparatus 190 is configured to remove a tool from the tool magazine 180 at the tool removal position and/or tool insertion position of the tool magazine 180 in order to supply this tool to the work spindle in a tool exchange and to supply the tool magazine 180 with a tool removed at the tool change position from the work spindle of the spindle apparatus 170 in a tool exchange.

The tool change apparatus 190 preferably comprises optionally a double gripper that can be swiveled for holding or receiving two tools or tool interfaces, optionally with a gripper portion for receiving a tool from the spindle or the tool magazine and another gripper portion with a tool to be inserted in the work spindle and/or the tool magazine.

On the side of the machine bed 110 that is opposite the tool magazine 180, the machine tool 100 according to FIG. 1 also comprises by way of example a material deposition apparatus 230 of a material deposition processing system 200, wherein said material deposition apparatus 230 can be inserted, clamped and/or received at the work spindle of the spindle apparatus 170 and is held e.g., at a third axis slide 220.

The third axis slide 220 can travel e.g., in a horizontally linear fashion on a slide guide 210 and is configured to be moved to the work spindle of the spindle apparatus 170 in order to insert, clamp and/or receive the material deposition apparatus 230 at the work spindle of the spindle apparatus 170, in particular instead of a tool WZ and/or a tool interface from the tool magazine 180.

While the tool magazine 180 can mainly supply material-removing or in particular machining tools, such as milling cutters or drills, which can be used to remove and/or in particular machine material from the workpiece WS clamped on the rotary table 130, the material deposition processing system 200 is configured by way of example to deposit material on the workpiece WS clamped on the rotary table 130 by means of a material deposition apparatus 230.

Here, the material deposition processing system 200 can preferably have a laser head processing unit as the material deposition apparatus 230. The material deposition apparatus 230 is configured to deposit material e.g., by deposition welding on the workpiece WS clamped on the rotary table 130. An exemplary laser head machining unit is described as a more special example of a material deposition apparatus 230 for deposition welding e.g., in DE 10 2013 224 649 A1.

A flexible cable supply to the material deposition processing system 200 or to the material deposition apparatus 230 is ensured in FIG. 1 e.g., by the feed line 233. In particular, the supply line 233 optionally comprises electric supply lines to supply electrical energy to the material deposition apparatus 230 (e.g., to supply energy to a deposition welding head or laser head, a process monitoring system comprising one or more sensors and/or measurement units and/or a camera for the visual process monitoring) and/or electric signal lines for transmitting control or feedback-control signals and/or for collecting processing data, in particular e.g., sensor signals, measurement signals and/or a video output signal.

FIGS. 2A to 2E show exemplary embodiments of a spindle carrier slide 171 of a spindle apparatus 170 according to an embodiment of the invention (e.g. according to an exemplary embodiment for use on the exemplary machine tool 100 according to FIG. 1 below the spindle head housing 160). FIG. 2A shows as an example a front view of the spindle carrier slide 171, FIG. 2B shows as an example a rear view of the spindle carrier slide 171, FIG. 2C shows as an example a side view of the spindle carrier slide 171 and FIGS. 2D and 2E show as an example perspective views of the spindle carrier slide 171.

The spindle carrier slide 171 of the spindle apparatus 170 holds a work spindle 172, which has a tool support 173 (or tool interface support 173) for receiving or clamping a tool or a tool interface at the work spindle 172. In FIGS. 2A to 2E, e.g., a tool interface unit 310 is received and/or clamped at the tool support 173 and is described in more detail below.

However, the tool support 173 is basically and generally configured to receive and/or clamp a tool interface in such a way that the tool interface received and/or clamped at the tool holder 173 and/or a tool attached, clamped or held thereat can be rotationally driven in order to produce a machining motion at the work spindle 172. The spindle apparatus 170 comprises for the rotational driving of the work spindle 172 preferably a spindle motor or spindle drive (not shown) which is preferably arranged in or at the spindle carrier slide 171.

As an example, slide guides 174 are arranged on the rear side of the spindle carrier slide 171. At these slide guides 174, the spindle carrier slide 171 can be supported or held e.g., in a vertically and linearly movable fashion on the second tool slide 150 (see FIG. 1, here the spindle carrier slide 174 can be arranged in the spindle head housing).

Next to or adjacent to the work spindle 172 and the tool holder 173, a tool coupling system 300 is arranged on the bottom side of the spindle carrier slide 171, comprising an energy transmission unit 320 and a coupling interface unit 330. As an example, the tool interface unit 310 is here also ascribed to the tool coupling system 300.

The tool support 173 is e.g., configured to receive or clamp tool interfaces of the hollow shank taper or hollow shank taper interface type. In further embodiments, the tool support 173 can, however, additionally or alternatively receive or clamp differently configured tool interfaces, such as steep tapers and/or Morse tapers.

FIG. 3 shows an exemplary perspective detailed view of a tool support 173 of a work spindle 172 according to an embodiment of the invention, e.g., according to FIGS. 2A to 2E. FIG. 4 shows an exemplary perspective view of a spindle apparatus 170 according to an embodiment of the invention, e.g., the spindle apparatus 170 which can be attached to the spindle carrier slide 171 according to FIG. 2A to 2E.

As an example, the spindle apparatus 170 comprises a spindle housing 175 where e.g., the spindle drive or spindle motor can be arranged and a mounting frame 176 which is mounted on the spindle housing 175 e.g., on the side of the tool support 173 and is made e.g., as an annular mounting frame where the spindle apparatus 170 can be attached to or mounted on e.g., the spindle carrier slide 171.

As an example, the coupling interface unit 330 of the tool coupling system 300 is preferably mounted in stationary and rotationally fixed fashion next to or adjacent to the work spindle 172 with tool support 173, e.g., by a fixed screw connection. The energy transmission unit 320 of the tool coupling system 300 is mounted in a preferably releasable and preferably stationary and rotationally fixed fashion on the coupling interface unit 330, e.g., via a releasable latch connection.

As an example, the energy transmission unit 320 of the tool coupling system 300 according to FIGS. 3 and 4 comprises a coupling element 321, which is mounted on the coupling interface unit 330 in a preferably releasable and preferably stationary and rotationally fixed fashion. As an example, a coil holder element 322 is arranged on the side of the coupling element 321 that is opposite the coupling interface unit 330, said coil holder element holding e.g., a transmitter coil unit 323 which accommodates a transmitter coil and/or a transmitter coil segment 324.

As an example, the tool interface unit 310 comprises a tool interface body 311 which is e.g., received in the tool support 173 of the work spindle 172 and is made e.g., as a hollow shank taper or a hollow shank taper section. Furthermore, the tool interface unit 310 comprises on the side opposite the tool interface body 311 also a tool receiving portion 313 for receiving or clamping a tool, such as a milling cutter or a drill. The tool interface unit 310 comprises between the tool support portion 313 and the tool interface body 311 e.g., a receiver coil unit 312, which can accommodate a receiver coil 314.

Figure 5A:
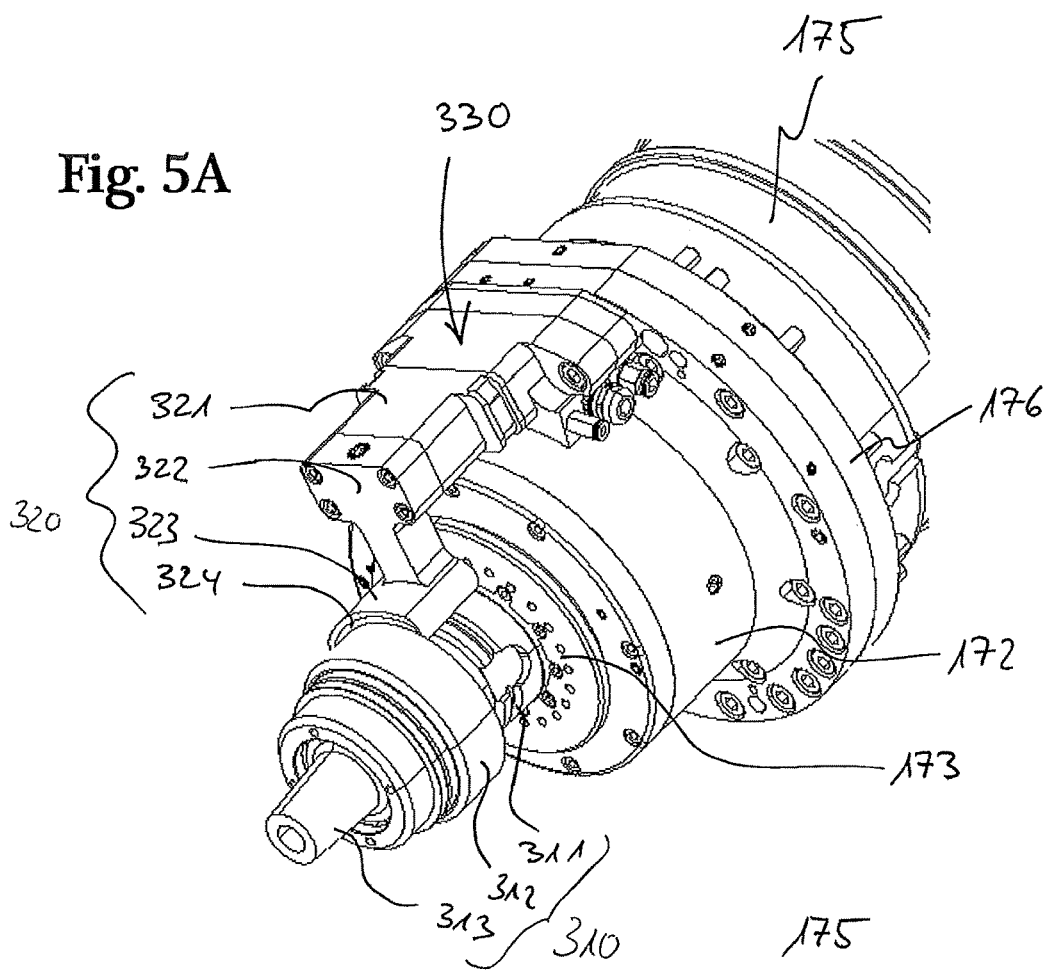
FIGS. 5A and 5B show exemplary perspective detailed views of the spindle apparatus according to FIG. 4 having an inserted tool interface unit.
Figure 5B:
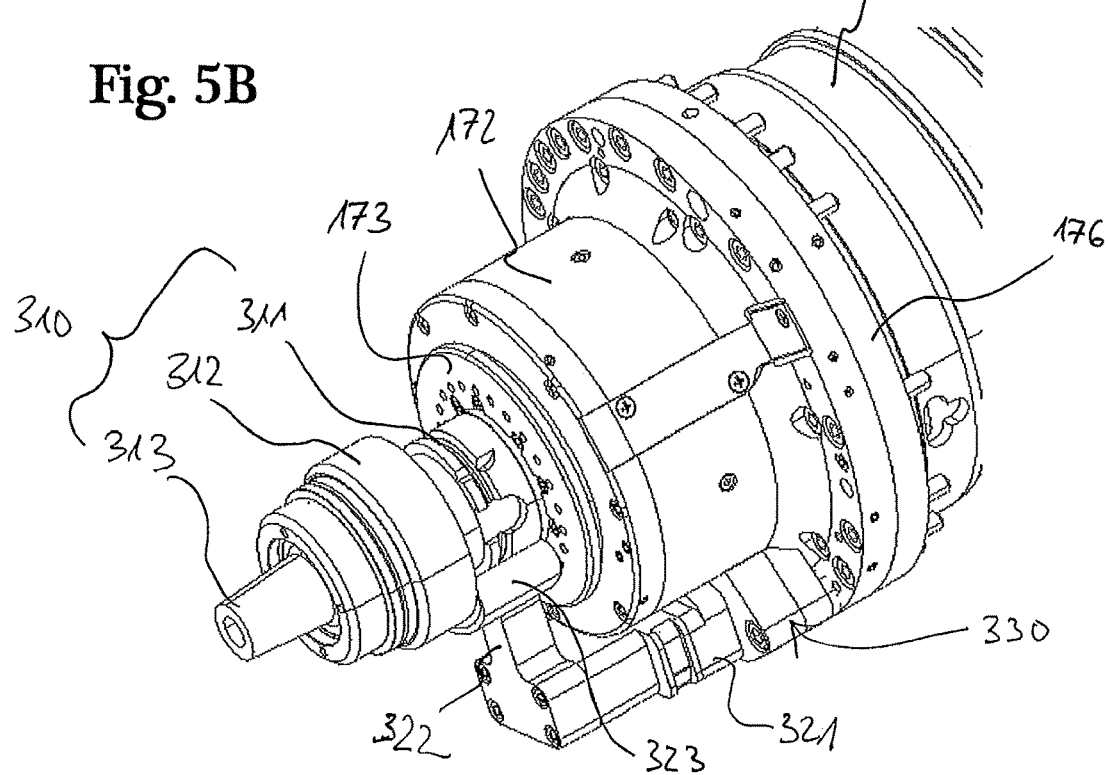

FIGS. 5A and 5B show exemplary perspective detailed views of the spindle apparatus 170 according to FIG. 4 with inserted tool interface unit 310. The tool coupling system 300 with the coupling interface unit 330 and the energy transmission unit 320 is arranged on or next to the work spindle 172 and/or the tool support 173 in such a way that the transmitter coil segment 324 of the transmitter coil unit 323 is arranged above or at least in part above the receiver coil 324 of the receiver coil unit 312 of the tool interface unit 310, viewed in an axial direction in relation to the spindle axis. This means in particular that the receiver coil 324 of the receiver coil unit 312 and the transmitter coil and/or the transmitter coil segment 324 of the transmitter coil unit 323 overlap or overlap in part, viewed in an axial direction in relation to the spindle axis, when it is received or clamped at the tool support 173 of the work spindle 172.

However, the receiver coil unit 312 and the transmitter coil unit 323 are arranged in this state with respect to one another in such a way that a thin air gap is provided between the receiver coil unit 312 and the transmitter coil unit 323 such that when driven by the work spindle 172, the tool interface unit 310 received or clamped in the tool holder 173 can rotate about the spindle axis in an unimpeded manner without contacting or dragging along the stationary energy transmission unit 320, it still being possible to transmit electrical energy and/or electric signals in contact-free fashion via a magnetic energy transmission analogously to a transformer via the air gap between the receiver coil unit 312 and the transmitter coil unit 323.

This is advantageous in particular when the tool interface unit 310 has one or more electrical loads which shall or must be supplied with electrical energy during the processing of the workpiece WS and/or in particular during the spindle-driven rotational movement of the tool interface unit 310.

In some embodiments of the invention, the tool interface unit 310 preferably comprises one or more drivable actuators and/or one or more readable sensors (e.g., temperature sensors, vibration sensors or electric, optical or inductive collision sensors) which can be supplied with electrical energy via the contact-free electro-magnetic connection between the receiver coil unit 312 of the tool interface unit 310 and the transmitter coil unit 323 of the energy transmission unit 320 for the energy supply and/or which can transmit back electric sensor or control signals and/or other feedback signals from the tool interface unit 310 via the contact-free electro-magnetic connection between the receiver coil unit 312 of the tool interface unit 310 and the transmitter coil unit 323 of the energy transmission unit 320.

In particularly preferred embodiments, the tool interface unit 310 comprises one or more vibration actuators and/or oscillation drives for generating a vibration/oscillation in an axial and/or radial direction in relation to the spindle axis and/or tool interface axis, in particular preferably within the ultrasonic frequency range e.g., for the ultrasonic processing where the machining rotation of the tool is superimposed by a vibration or oscillation within the ultrasonic range. For this purpose, e.g., piezo actuators and/or piezo elements can be used to control or feedback-control the generation of the vibration and/or oscillation. In this connection, reference is made in particular to the tools, tool apparatuses and processing methods described in DE 10 2009 008 227 A1, DE 10 2012 219 254 A1 and DE 10 2013 210 199 A1.

Figure 6A:
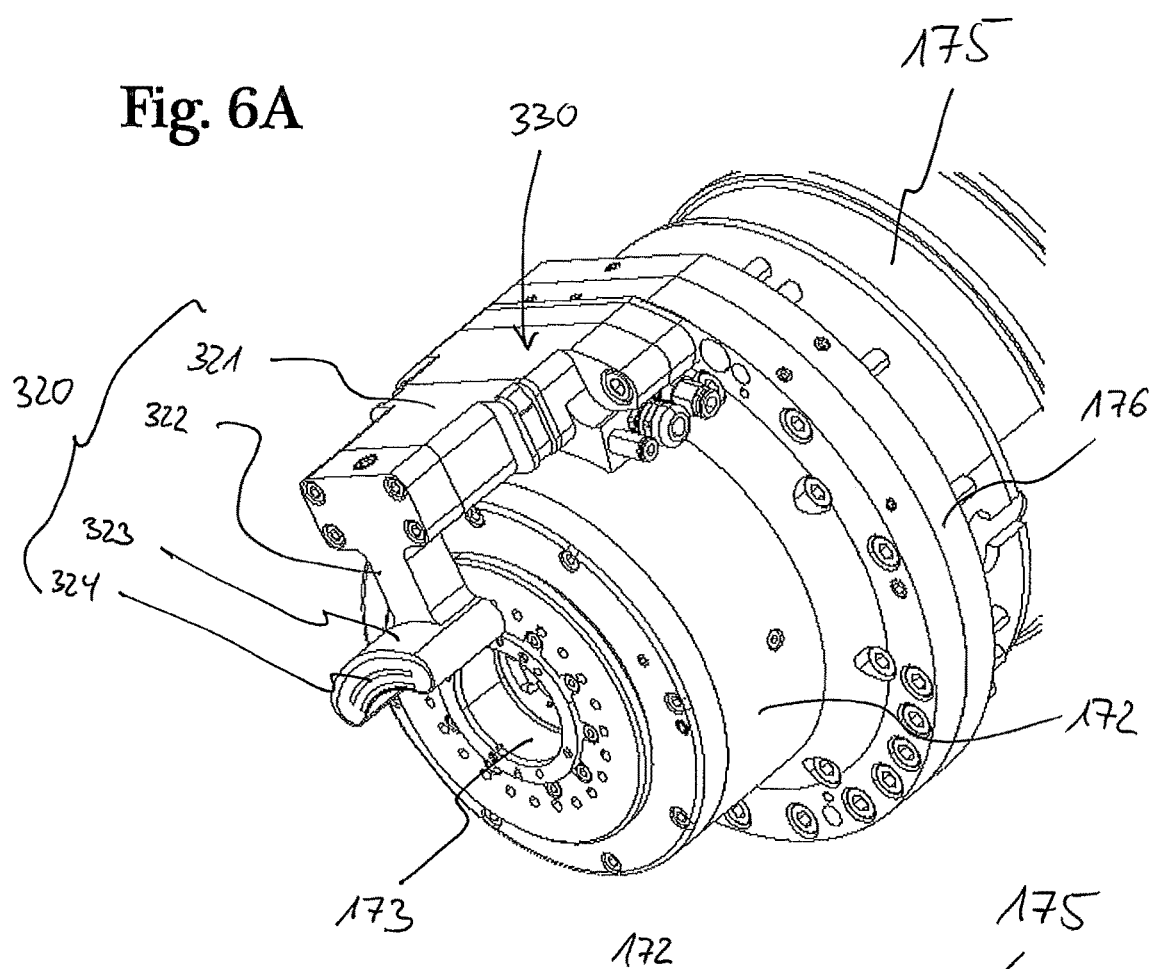
FIGS. 6A and 6B show exemplary perspective detailed views of the spindle apparatus according to FIG. 4 without inserted tool interface unit.
Figure 6B:
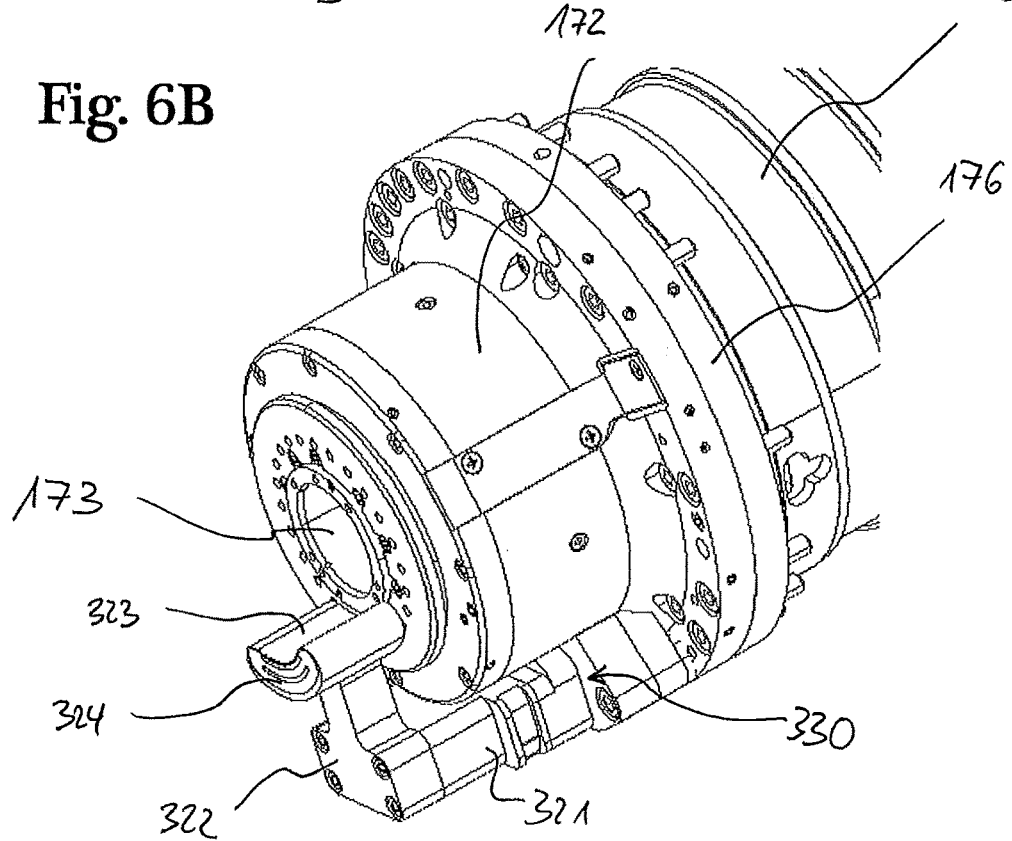

FIGS. 6A and 6B show exemplary perspective detailed views of the spindle apparatus 170 according to FIG. 4 without inserted tool interface unit 310. As an example, FIGS. 6A and 6B show that as an example the transmitter coil unit 323 of the energy transmission unit 320 does not form a complete circle with the transmitter coil segment 324 but is made as a pitch circle segment which is arranged or placed only on one side of the tool support 173 of the work spindle 172. Therefore, the advantage is that, on the one hand, the energy transmission unit 320 can be provided in a space-saving and cost-effective manner with the transmitter coil segment 324 and, on the other hand, the space around the tool support 173 can largely be kept free in spite of the energy transmission unit 320 with the transmitter coil segment 324. Therefore, the work spindle 172 and the tool support 173 are clearly visible and the introduction of a tool interface is simplified even if the energy transmission unit 320 with the transmitter coil segment 324 is positioned or mounted on the work spindle 172.

FIGS. 7A to 7C show exemplary perspective detailed views of a tool coupling system 300 according to an embodiment of the invention. As an example, it comprises the above described units including the tool interface unit 310, the energy transmission unit 320 and the coupling interface unit 330.

Figure 8A:
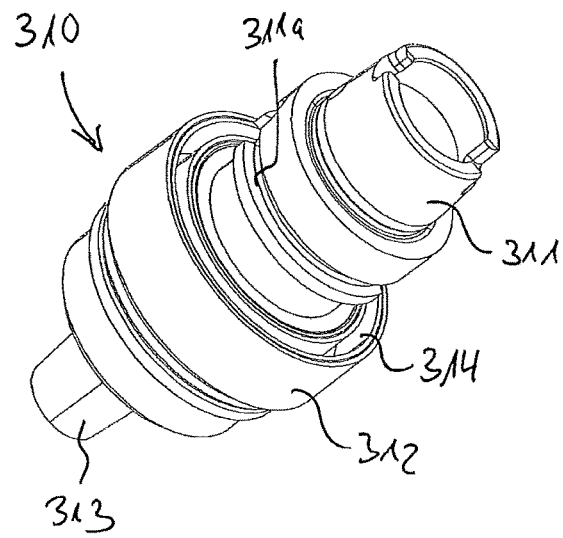
FIGS. 8A and 8B show exemplary perspective detailed views of a tool interface unit of the tool coupling system according to FIGS. 7A to 7C.
Figure 8B:
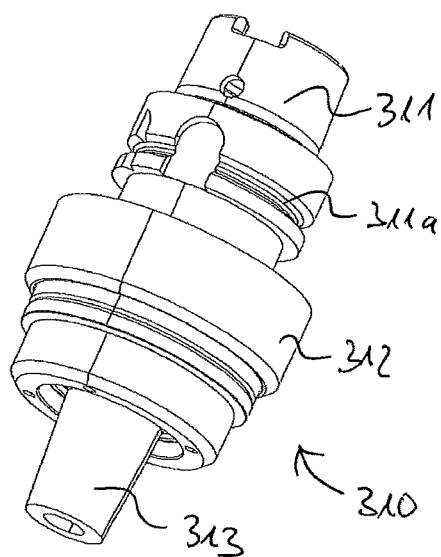
Figure 9A:
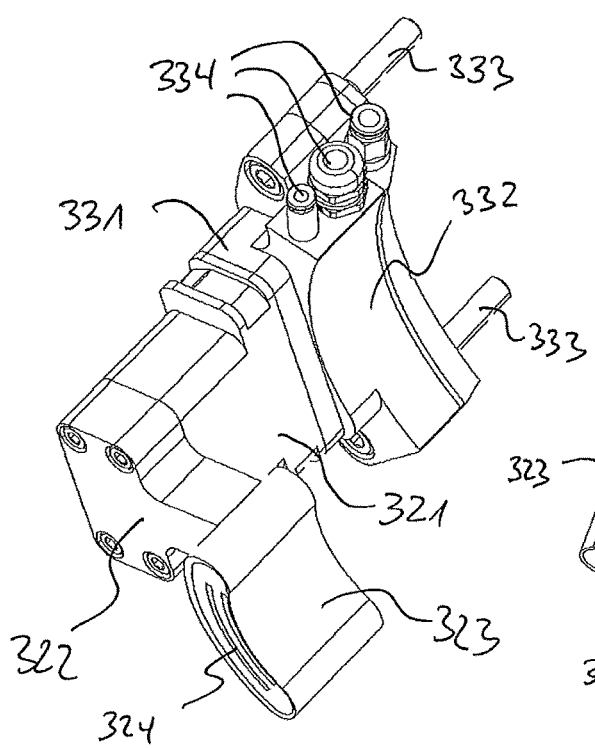
FIGS. 9A and 9B show exemplary perspective detailed views of the tool coupling system according to FIGS. 7A to 7C without tool interface unit.
Figure 9B:
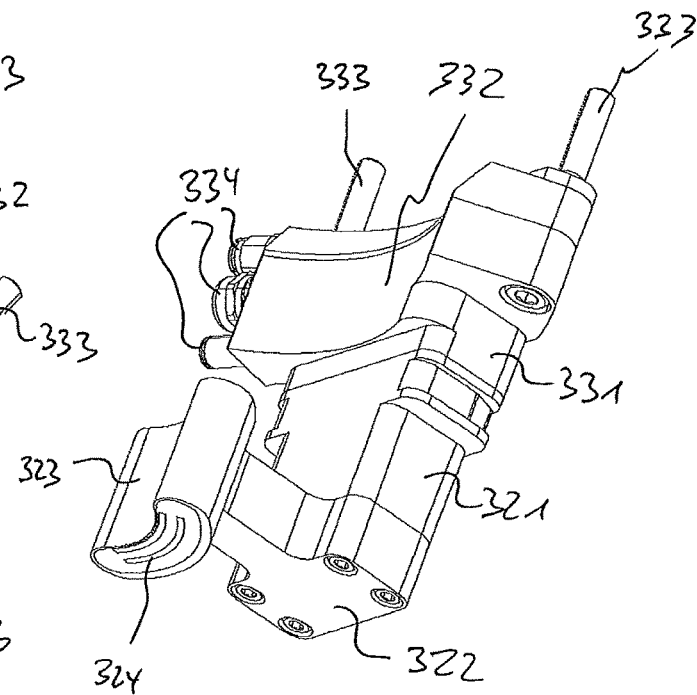

FIGS. 8A and 8B show exemplary perspective detailed views of the tool interface unit 310 of the tool coupling system 300 according to FIGS. 7A and 7C, and FIGS. 9A and 9B show exemplary perspective detailed views of the tool coupling system 300 according to FIGS. 7A to 7C without tool interface unit 310.

FIGS. 7A and 8A show the bottom side of the receiver coil unit 312 of the tool interface unit 310 where the receiver coil 314 portion can be seen which extends e.g., annularly and e.g., over the entire circumference about the tool interface axis and/or in the housing of the receiver coil unit 312. Therefore, it is ensured in an advantageous manner that the receiver coil unit 312 can continuously stay in contact-free touch with the transmitter coil unit 323 of the energy transmission unit 320 that is formed only as a segment or pitch circle segment during the spindle-driven rotation of the tool interface unit 310.

FIGS. 7A to 7C and 8A to 8B also show that the tool interface unit 310 e.g., forms, over the circumference of the tool interface body 311, a gripper groove 311a where the gripper or a gripping portion of a tool changer or a gripper of the tool change apparatus 190 according to FIG. 1 can grip the tool interface unit 310 for the tool exchange at the work spindle 172, e.g., in order to exchange the tool interface unit with another tool or another tool interface unit 310.

As an example, the coupling interface unit 330 comprises a coupling element 331, which can be coupled to the coupling element 321 of the energy transmission unit 320 and/or on which the coupling element 321 of the energy transmission unit 320 can be mounted in a preferably releasable and preferably stationary and rotationally fixed fashion.

In addition, the coupling interface unit 330 further comprises e.g., an interface body element 332 arranged on the side opposite the coupling element 331 for attachment to the spindle apparatus 170 and/or the spindle carrier slide 171, wherein attachment elements 333 are attached to the interface body element 332 on the side facing away from the coupling element 321 for the stationary and rotationally fixed attachment (e.g., by screw connections) to the spindle apparatus 170 and/or the work spindle 172, to the portion of the spindle attachment frame 176 adjacent to the work spindle 172 or to a portion of the spindle carrier slide 171 adjacent to the work spindle 172.

Furthermore, a plurality of connections or connection elements 334 is laterally arranged on the interface body element 332 of the coupling interface unit 330. The connection elements 334 make possible e.g., an external connection of electric signal and/or power lines via the connected coupling elements to the transmitter coil 324 of the transmitter coil unit 323 for the electrical energy supply of the tool interface unit and/or for the input and/or output of control, feedback-control and/or sensor signals. Furthermore, hydraulic and/or pneumatic connections can be provided, e.g., when in some embodiments the coupling of the coupling elements 321 and 331 of the energy transmission unit 320 and the coupling interface unit 330 can be switched e.g., pneumatically and/or hydraulically between a locked or latched connection state and an unlocked or released connection state. Such a switchable unlocking or locking of the coupling elements can also be controlled electrically in further embodiments.

Figure 10A:
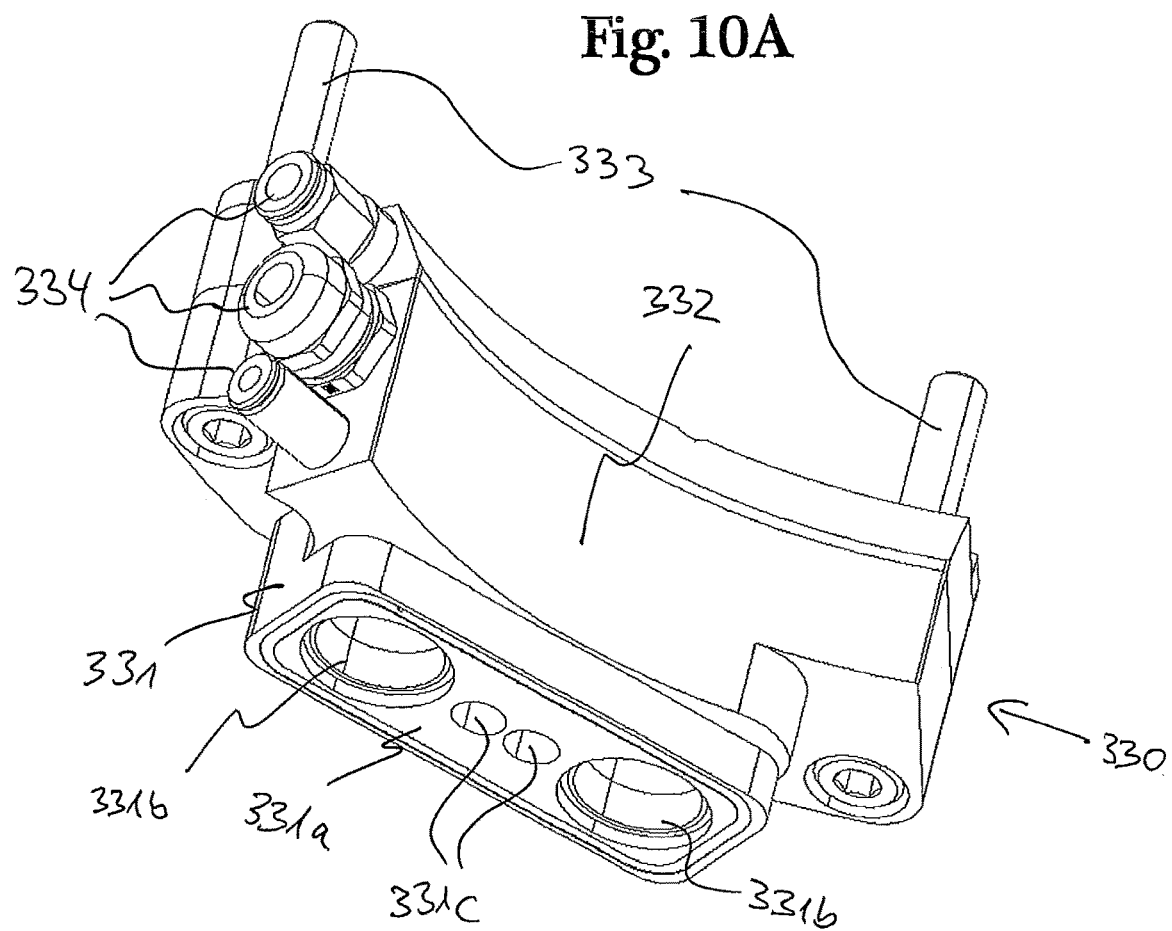
FIGS. 10A and 10B show in each case exemplary perspective detailed views of a coupling interface unit and an energy transmission unit of the tool coupling system according to FIGS. 7A to 7C.
Figure 10B:
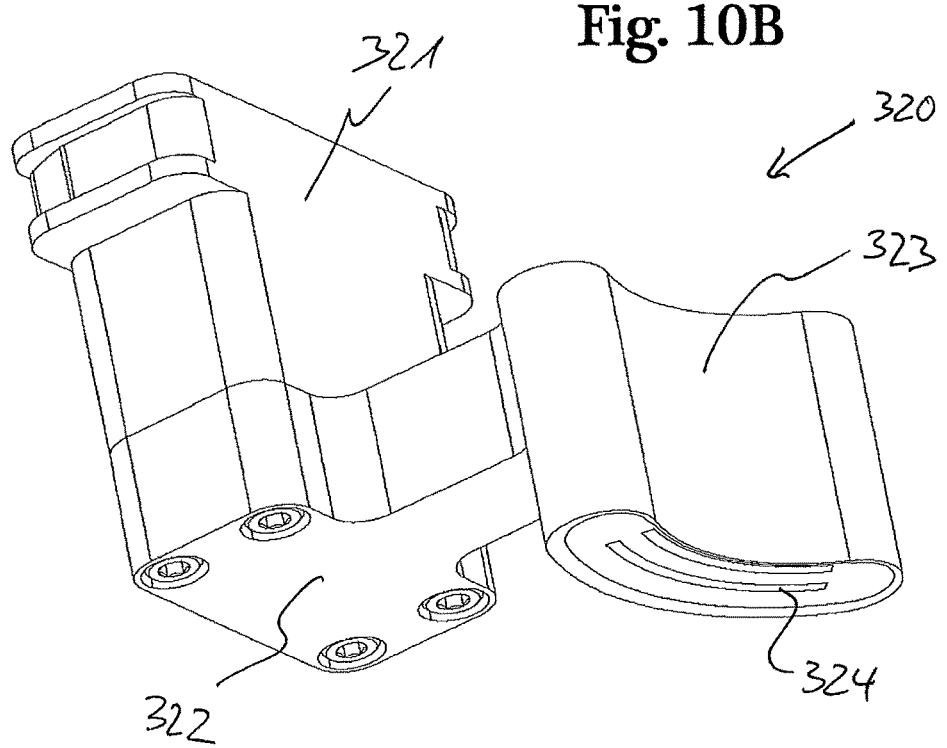

FIGS. 10A and 10B show exemplary perspective detailed views of the coupling interface unit 330 and the energy transmission unit 320 of the tool coupling system according to FIGS. 7A to 7C in the uncoupled or released state. FIG. 10B shows the above described energy transmission unit 320 with the coupling element 321 of the energy transmission unit 320 (which can be coupled, or releasably attached to or with the coupling element 331 of the coupling interface unit 330), the coil holder element 322, the transmission coil unit 323 and the transmission coil segment 324.

FIG. 10A shows the above described coupling interface unit 330 with the attachment elements 333, the interface body element 332 and the coupling element 331 of the coupling interface unit 330 (which can be coupled, or releasably attached, to or with the coupling element 321 of the energy transmission unit 320).

On the bottom side of the coupling element 331 of the coupling interface unit 330, the coupling element 331 has a coupling portion 331a for the coupling or releasable attachment to the coupling element 321 of the energy transmission unit 320. The coupling portion 331a comprises by way of example a plurality of attachment portion openings 331b (e.g., to receive attachment elements for the coupling or releasable attachment to the coupling element 321 of the energy transmission unit 320) and by way of example contact receiving openings 331c arranged between the attachment portion openings 331b (e.g., for electric contact connections for electric signal and/or power lines to the transmitter coil unit 323 of the energy transmission unit 323).

Figure 11A:
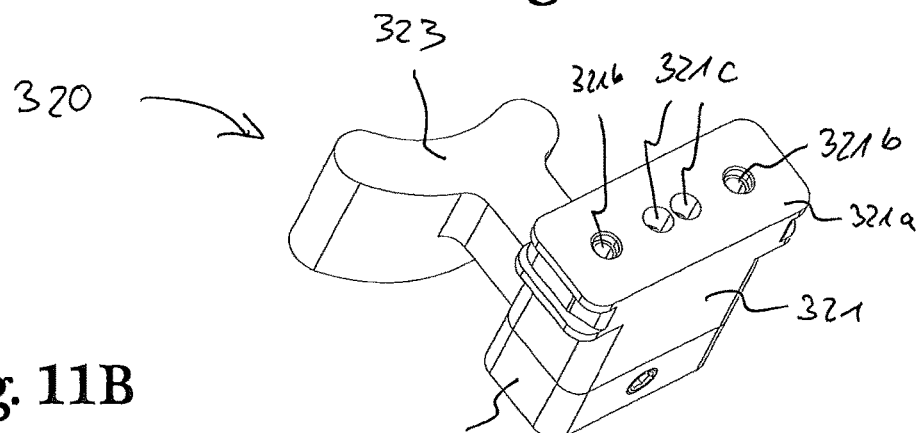
FIGS. 11A and 11B show exemplary perspective detailed views of the energy transmission unit according to FIG. 10B.
Figure 11B:
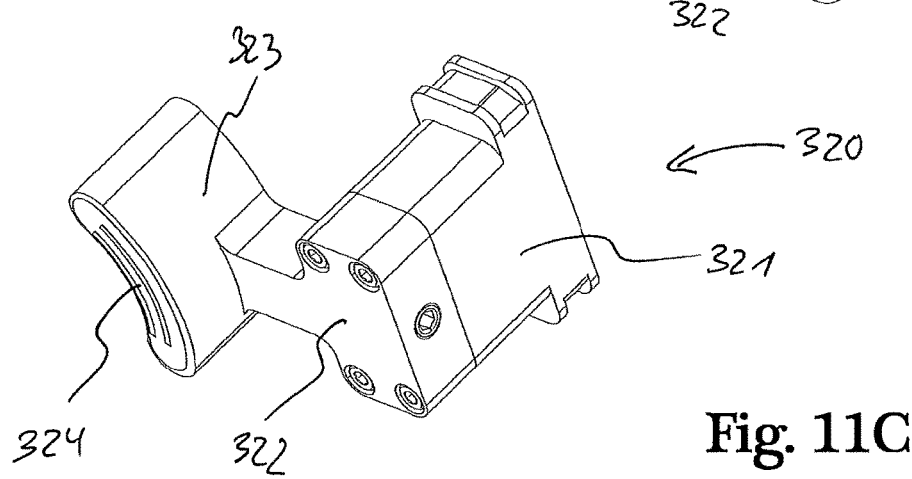
Figure 11C:
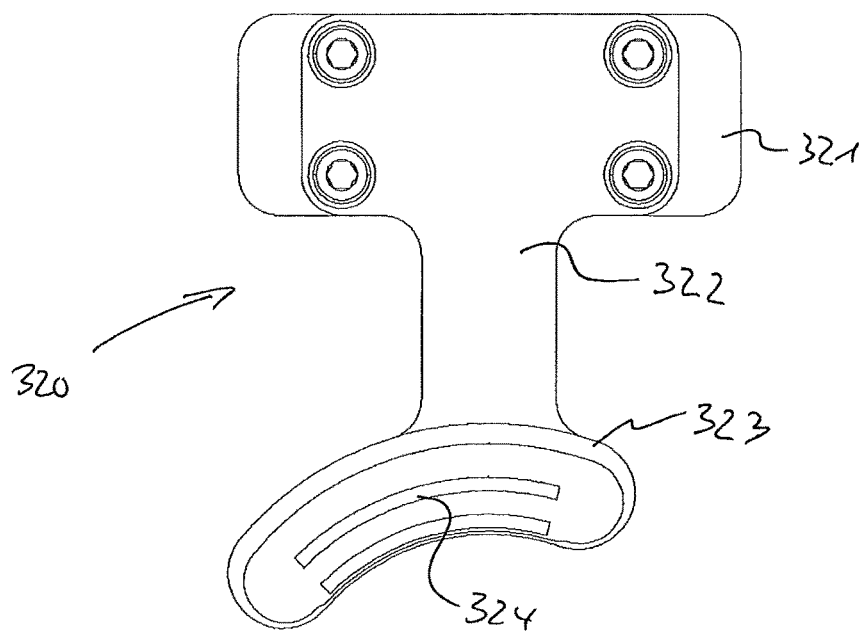
FIG. 11C shows an exemplary subview of the energy transmission unit according to FIG. 10B.

FIGS. 11A and 11B show exemplary perspective detailed views of the energy transmission unit 320 according to FIG. 10B, and FIG. 11C shows an exemplary bottom view of the energy transmission unit 320 according to FIG. 10B. As an example, it is shown that the coupling elements 321 is attached to the coil holder element 322 by means of the screw connection using e.g., four screws (see FIGS. 11B and 11C) and the transmitter coil unit 323 is attached to the coil holder element 322 by means a screw connection using e.g., one screw (see FIGS. 11A and 11B).

On the top side of the coupling element 321 of the energy transmission unit 320, the coupling element 321 has a coupling portion 321a for the coupling and/or releasable attachment to the coupling element 331 of the coupling interface unit 330. The coupling portion 321a comprises e.g., a plurality of attachment portion openings 321b (e.g., to receive attachment elements for the coupling and/or releasable attachment to the coupling element 331 of the coupling interface unit 330) and e.g., contact support openings 321c arranged between the attachment portion openings 321b (e.g., for electric contact connections for electric signal and/or power lines to the transmitter coil unit 323).

The coupling portions 321a and 331a are preferably formed with respect to one another as a plug connection system, the respective attachment portion openings 321b and 331b respectively having preferably mechanical plug connection elements and the contact support openings 321c and 331c respectively having preferably electric contact plug connection elements.

In some embodiments, the attachment portion openings 321b of the coupling element 321 of the energy transmission unit 320 can have e.g., mechanically male plug connection elements and the attachment portion openings 331b of the coupling element 331 of the coupling interface unit 330 can have corresponding mechanically female plug connection elements.

In other embodiments, the attachment portion openings 321b of the coupling element 321 of the energy transmission unit 320 can have e.g., mechanically female plug connection elements and the attachment portion openings 331b of the coupling element 331 of the coupling interface unit 330 can have corresponding mechanically male plug connection elements.

Mixed combinations are also conceivable where the attachment portion openings 321b of the coupling element 321 of the energy transmission unit 320 have e.g., mechanically female and mechanically male plug connection elements and the attachment portion openings 331b of the coupling element 331 of the coupling interface unit 330 have corresponding mechanically male and female plug connection elements.

By analogy, the contact support openings 321c can also have electrically male and/or female contact plug connection elements and the contact support openings 331c can have corresponding electrically female and/or male contact plug connection elements.

Figure 12A:
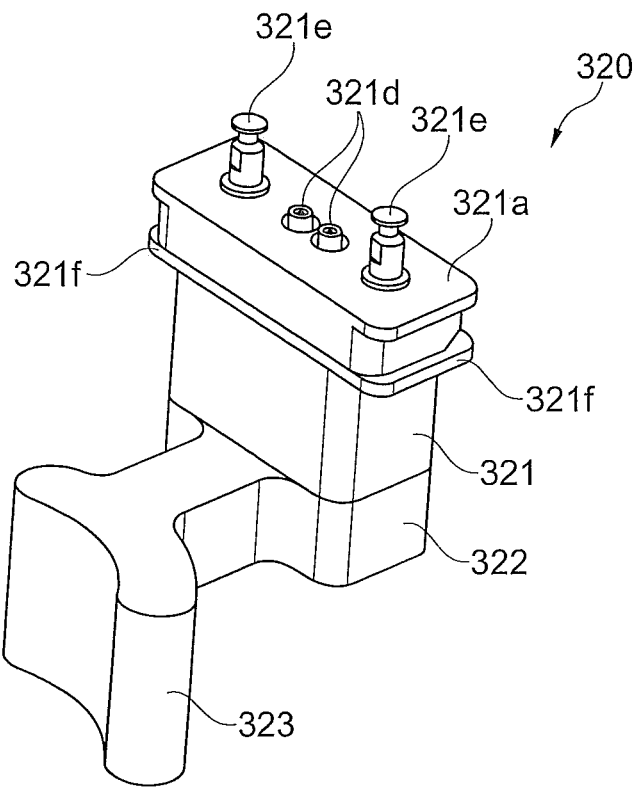
FIG. 12A shows an exemplary perspective view of an energy transmission unit according to an embodiment of the invention.
Figure 12B:
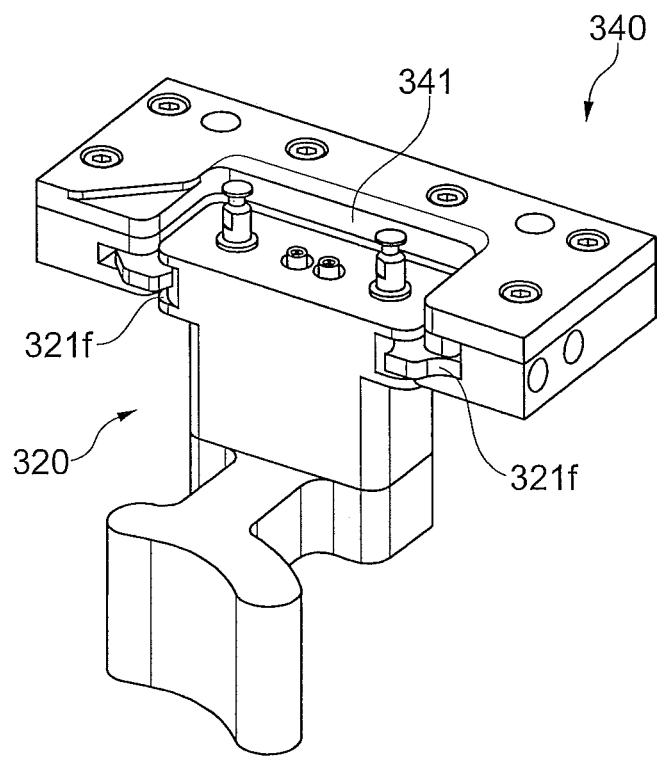
FIG. 12B shows an exemplary perspective view of the energy transmission unit according to FIG. 12A in a coupling element holder.
Figure 13A:
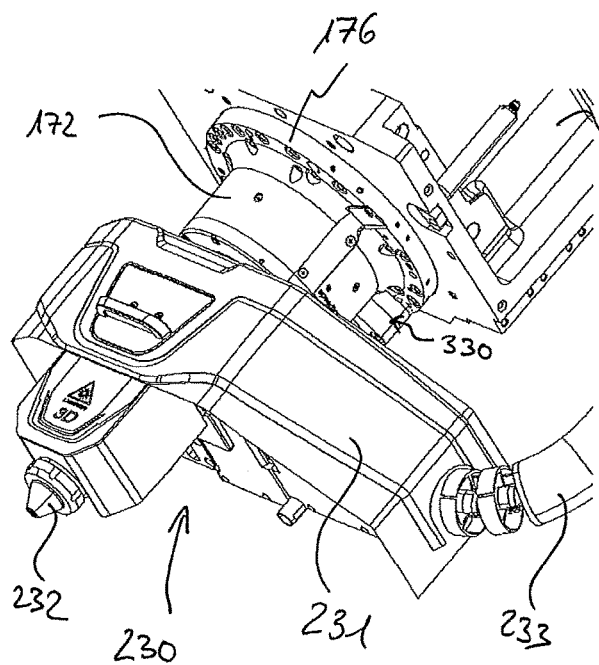
FIGS. 13A to 13D show exemplary detailed views of the spindle apparatus according to FIG. 4 with inserted material deposition apparatus according to an embodiment of the invention.
Figure 13B:
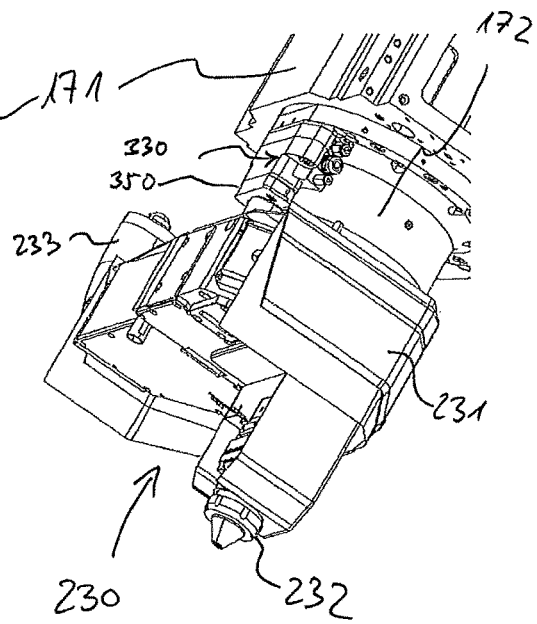
Figure 13C:
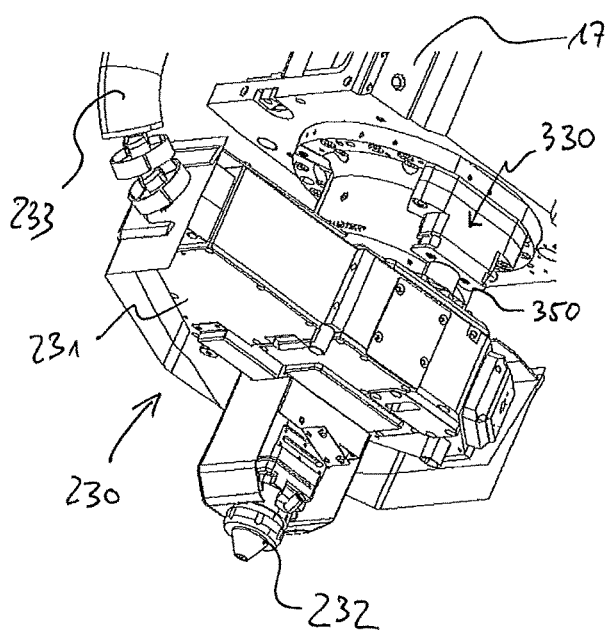
Figure 13D:
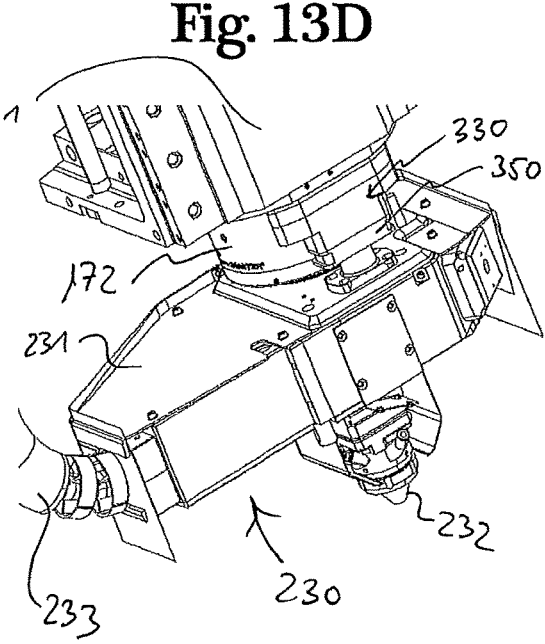

FIG. 12A shows an exemplary perspective view of an energy transmission unit 320 according to an embodiment of the invention, and FIG. 12B shows an exemplary perspective view of the energy transmission unit 320 according to FIG. 12A in a coupling element support 341 of a coupling element holder 340.

In FIGS. 12A and 12B, the coupling portion 321a of the coupling element 321 of the energy transmission unit 320 is equipped by way of example with mechanically male plug connection elements 321e in the attachment portion openings. These plug connection elements 321e (e.g., attachment bolts 321e) are made e.g., as locking bolts for a releasable latch connection with the coupling element 331 of the coupling interface unit 330. Furthermore, e.g., electrically male contact plug connection elements 321d are provided in the contact support openings of the coupling element 321 of the energy transmission unit 320 in FIGS. 12A and 12B.

The coupling element 321 also has laterally arranged holding portions 321f. According to FIG. 12B, the coupling element 321 can be held or supplied via the holding portions 321f at the coupling element support 341 of the coupling element holder 340. For example, such a coupling element holder 340 can be provided at the machine tool 100 to store or supply the energy transmission unit 320 unless it is docked or coupled to the coupling interface unit 330.

For example, it is advantageous to provide several different energy transmission units 320 in respective coupling element holders 340, e.g., for different application cases optionally with transmitter coil units 323 having different sizes and/or different coil diameters (e.g., for tool interface units 310 with different or differently dimensioned tool interface bodies 311) and/or receiver coil units 312 of different sizes and/or different coil diameters. The different energy transmission units 320 all have preferably an equally formed coupling element 321 to be docked or coupled e.g., advantageously to the same coupling interface unit 330. This makes possible in advantageous fashion an optionally automatic exchange of the energy transmission unit 320 in accordance with possible desired exchanges of tool interface units 310.

In addition, the energy transmission unit 320 can be stored intermediately in an advantageously simple fashion at the coupling element holder 340 when instead of a tool interface unit 310a normal tool shall be introduced by means of the tool change apparatus 190 at the work spindle 172 or even when a possible material deposition apparatus 230 of a material deposition processing system 200 shall be used at the tool support 173 of the work spindle 172.

Here, a controllable manipulator or handling robot, optionally with gripping apparatus, can preferably be provided at a machine tool 100, which is configured to remove or drop, optionally in automatic fashion, an energy transmission unit 320 at a coupling element holder 340 and/or to receive, optionally in automatic fashion, an energy transmission unit 320 docked or coupled and releasably attached to the coupling interface unit 320 and/or to dock or couple, optionally in an automatically releasable attachment an energy transmission unit 320 to the coupling interface unit 330.

FIGS. 13A to 13D show by way of example perspective detailed views of the spindle apparatus 170 according to FIG. 4 with an inserted material deposition apparatus 230 according to an embodiment of the invention.

The material deposition apparatus 230 comprises a processing head housing 231 which holds a material deposition processing head 232 that has e.g., a nozzle for depositing material on a workpiece. As an example, the material deposition processing head 232 is made as a laser head which is configured to apply material to the surface of a workpiece by deposition welding, a metallic powder being applied to the surface of the workpiece by the nozzle of the material deposition processing head 232 and being joined to the surface by means welding using a laser beam. In this connection, reference is made once again to the processing heads and deposition welding processing methods described in DE 10 2013 224 649 A1.

In order to supply the material deposition processing head 232 e.g., with electrical energy, control signals, deposition material e.g., as a metallic power and a pressurized gas in order to avoid oxidation of the supplied powder during deposition welding and in order to supply the powder from the nozzle of the material deposition processing head 232, the supply line 233 is attached to the material deposition apparatus 230 and connected to the material deposition processing head 232.

In FIGS. 13A to 13D, the material deposition apparatus 230 is received e.g., at the work spindle 172 of the spindle apparatus 170. Said Figures show the coupling interface unit 330 attached to the spindle apparatus 170 according to the above described embodiments, and a coupling element thereof is provided with another coupling element of a coupling element adapter 350 for the material deposition apparatus 230.

Figure 14:
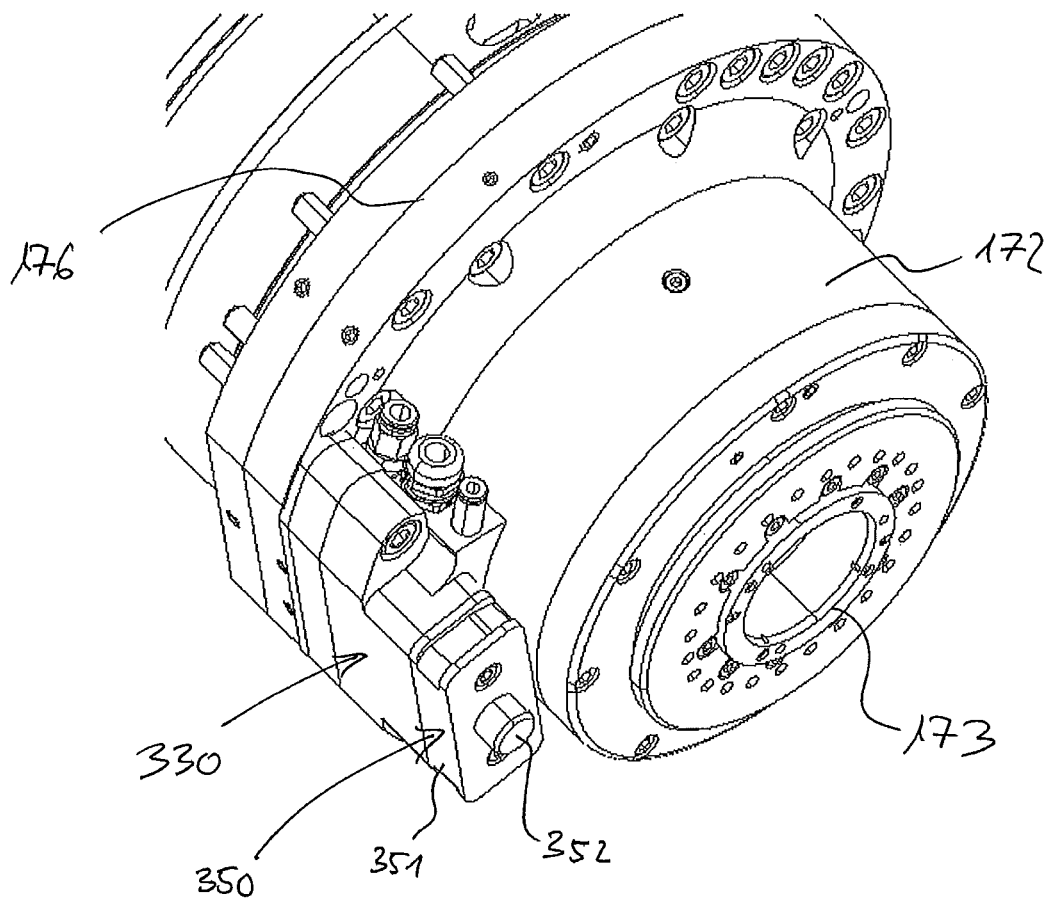
FIG. 14 shows an exemplary perspective detailed view of the spindle apparatus according to FIG. 4 without inserted material deposition apparatus.

FIG. 14 shows an exemplary perspective detailed view of the spindle apparatus 170 according to FIG. 4 without inserted material deposition apparatus 230. This figure shows the coupling element adapter 350 for the material deposition apparatus 230 in a state of the releasable attachment of the coupling elements, coupled to docked to the coupling element 331 of the above described coupling interface unit 330, the coupling element adapter 350 having a coupling element 351 analogously to the coupling element 321 of the above described energy transmission unit 320.

Figure 15A:
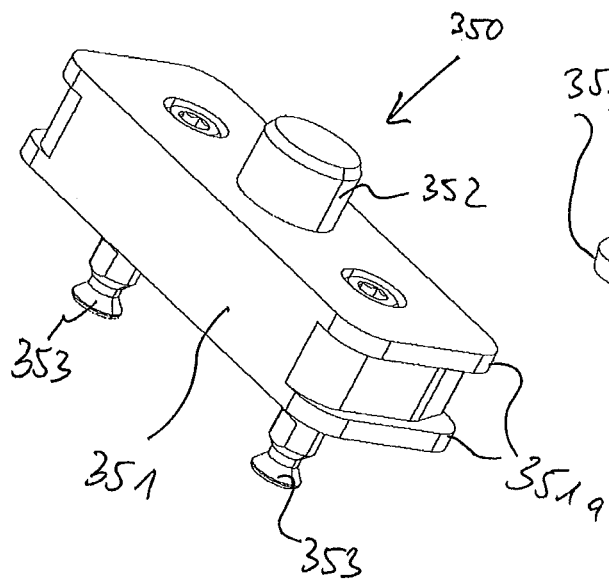
FIGS. 15A and 15B show exemplary perspective detailed views of a coupling element adapter of a tool coupling system according to an embodiment of the invention.
Figure 15B:
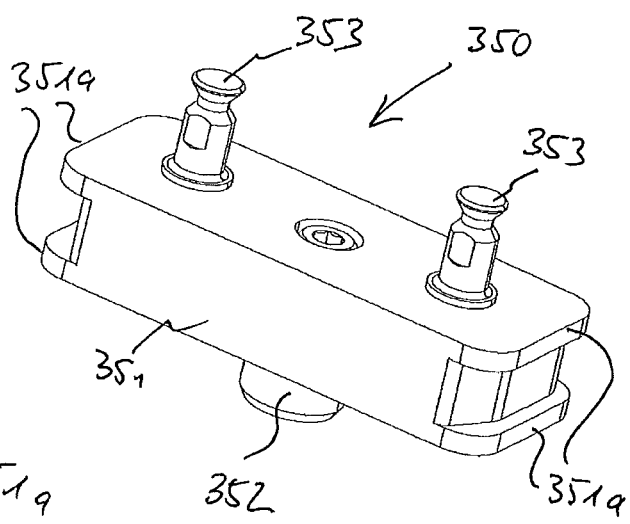

FIGS. 15A and 15B show by way of example perspective detailed views of the coupling element adapter 350 of the tool coupling system 300 according to an embodiment of the invention.

The coupling element 351 of the coupling element adapter 350 has lateral holding portions 351a analogously to the coupling element 321 of the above described energy transmission unit 320, where the coupling element adapter 350 can be received and supplied at the coupling element support 341 of the coupling element holder 340 analogously to the energy transmission unit 320 according to FIG. 12B. The coupling element 351 of the coupling element adapter 350 also has attachment bolts 353 as plug connection elements e.g., analogously to the energy transmission unit 320 according to FIG. 12A. Male and/or female plug connection elements can here be provided in further embodiments in accordance with the configuration of the coupling interface unit 330.

Figure 16:
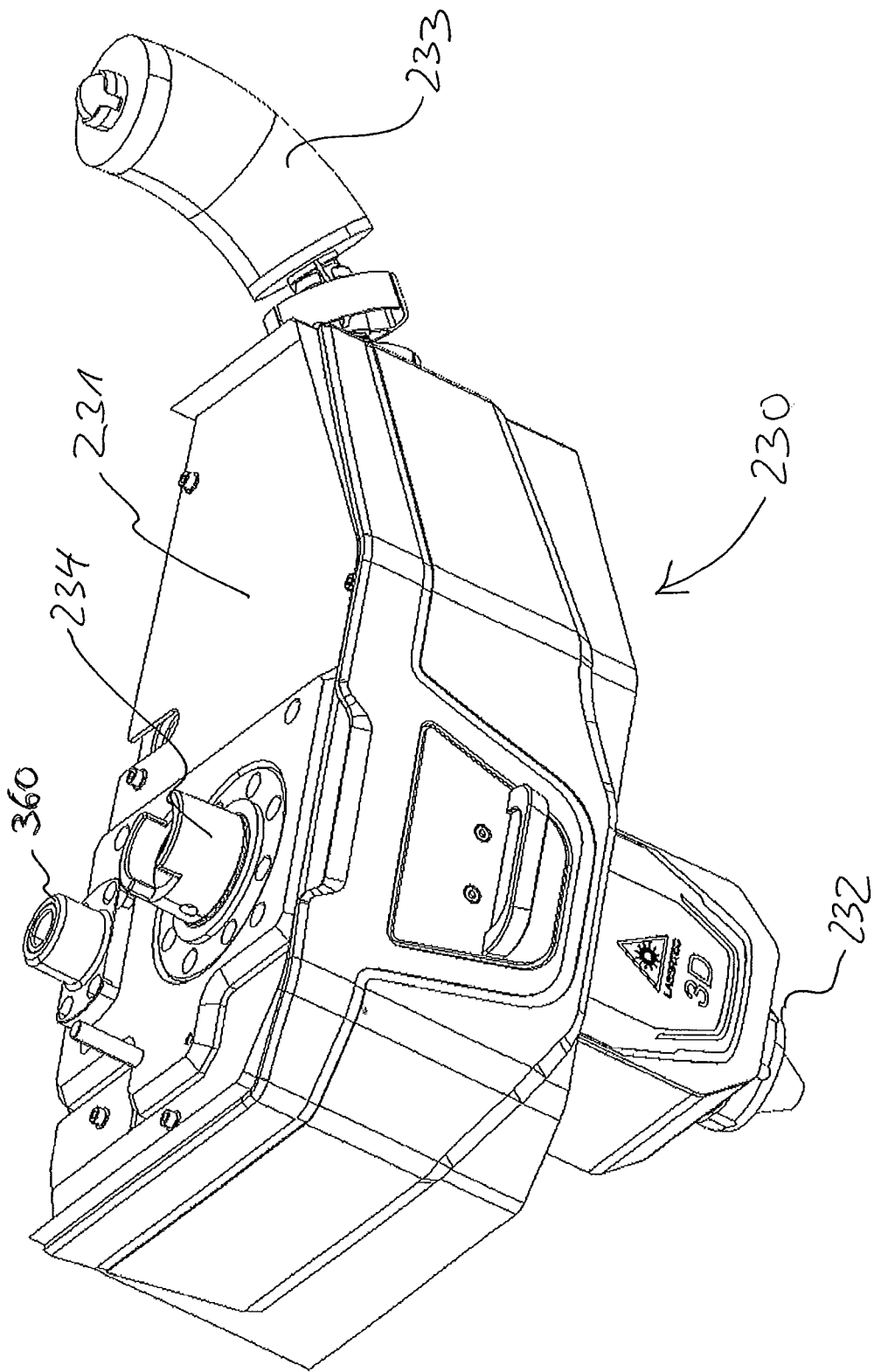
FIG. 16 shows an exemplary perspective view of the material application apparatus according to FIGS. 13A to 13D.

On the side opposite the attachment bolts 353, the coupling element 351 of the coupling element adapter 350 has e.g., another attachment element 352 (e.g., made as a mechanically male plug connection element) for a detachable connection to a corresponding attachment element 360 of the tool coupling system 300 (see FIG. 16). The attachment elements 352 and 360 are also made preferably as corresponding fitting plug connection elements.

FIG. 16 shows an exemplary perspective view of the material deposition apparatus 230 according to FIGS. 13A to 13D. Said apparatus comprises, as described above by way of example, the material deposition processing head 232 held at the processing head housing 231 and the connected supply line 233. Furthermore, the processing head housing 231 has or holds a tool interface body 234 on the side opposite the material deposition processing head 232, said tool interface body being made e.g., as a hollow shank taper interface portion.

The tool support 173 of the work spindle 172 is adapted analogously to the support of the tool interface body 311 of the tool interface unit 310 to receive or clamp the tool interface body 234 of the material deposition apparatus 230. The attachment element 360 of the tool coupling system 300 is mounted on or optionally attached by means of a screw connection to the processing head housing 231 on the side opposite the material deposition processing head 232 adjacent or next to the tool interface body 234.

When the material deposition apparatus 230 is received or clamped by the tool interface body 234 at the tool support 173 of the work spindle 172 (see e.g., FIGS. 13A to 13D), the attachment elements 360 and 252 are connected to one another, e.g., by means of a stationary positive-fit plug connection which is transverse to the spindle axis.

Due to this it is possible to simultaneously obtain, when the material deposition apparatus 230 is inserted at the work spindle 172, an advantageously precise and perfectly fitting position of the material deposition apparatus 230 which might be inserted in the tool support 173 of the work spindle 172 theoretically on account of the rotationally symmetric tool interface and/or the rotationally symmetric hollow shank taper at various angular positions but on account of the second connection of the attachment elements 360 and 352 is set to a single angular position.

Furthermore, the second connection of the attachment elements 360 and 252 advantageously stabilizes the orientation of the material deposition apparatus 230 even when the spindle carrier 171 is rapidly moved in the horizontal direction (i.e., e.g., in the directions of the X-axis and Y-axis of the axis slide assembly of the machine tool 100) and thus prevents advantageously a twisting of the material deposition apparatus 230 when the spindle carrier 171 is rapidly moved in a horizontal direction and a possible undesired post-pulse oscillation of the material deposition apparatus 230 about the spindle axis.

In summary, a versatile, space-saving and cost-effective tool interface system or coupling interface system for machine tools is provided which can be used in particular space-saving and cost-effective fashion with advantageously synergistic effects with respect to the advantageous energy and signal transmission or supply and to advantageously efficient, time-saving and versatile tool change possibilities and accurate tool and processing head orientation, in particular when used for hybrid machine tools, where optionally in addition to a conventional machining further processing possibilities can be combined, such as tool interface units which have an electrical load and are used e.g., in the ultrasonic processing, and/or in connection to material deposition processing heads for depositing material on the conventionally material-removing machine tool.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for use with a spindle apparatus of a machine tool, comprising:
an energy transmission unit having a transmitter coil unit for contact-free transmission of electrical energy to a receiver coil unit of a tool interface unit, the tool interface unit including:
the receiver coil unit;
an electrical load; and
a tool interface portion configured to be received by a tool support of a work spindle of the spindle apparatus; and
the system further comprising:
a coupling interface unit having an interface body element configured to be releasably attached to the spindle apparatus,
wherein the coupling interface unit includes a second coupling element configured to be releasably coupled to a first coupling element of the energy transmission unit; and
wherein the coupling interface unit has an electrically, hydraulically, or pneumatically controllable locking mechanism for unlocking and locking the releasable connection between the first and second coupling elements.

2. The system according to claim 1, wherein:
the first and second coupling elements each have one or more plug connection elements such that the one or more plug connection elements of the first coupling element are configured with the one or more plug connection elements of the second coupling element to establish a releasable plug connection for the releasable attachment of the first coupling element to the second coupling element.

3. The system according to claim 1, wherein:
the first and second coupling elements each have interconnectable electrical contact portions for establishing an electric connection between the first and second coupling elements when the first coupling element is releasably attached to the second coupling element.

4. The system according to claim 3, wherein:
the first coupling element is configured to electrically connect the transmitter coil unit of the energy transmission unit with the electric contact portions of the first coupling element.

5. The system according to claim 3, wherein:
the second coupling element is configured to electrically connect the electric contact portions of the second coupling element with electric connection elements arranged on the interface body element of the coupling interface unit.

6. The system according to claim 1, wherein:
the coupling interface unit has electric, hydraulic or pneumatic connection elements arranged on the interface body element in order to control the locking mechanism.

7. The system according to claim 1, wherein:
the interface body element of the coupling interface unit can be attached to the spindle apparatus by a screw connection.

8. The system according to claim 1, further comprising:
a coupling element holder that can be attached to the machine tool and that has a coupling element support for holding the energy transmission unit when the first coupling element of the energy transmission unit is uncoupled from the second coupling element of the coupling interface unit.

9. The system according to claim 1, further comprising:
a coupling element adapter having a third coupling element, wherein the third coupling element is configured to be coupled by a releasable connection to the second coupling element of the coupling interface unit.

10. The system according to claim 9, wherein:
the third and second coupling elements each have one or more plug connection elements such that, together with the one or more plug connection elements of the second coupling element, the one or more plug connection elements of the third coupling element are configured to establish a releasable plug connection for the releasable attachment of the third coupling element to the second coupling element.

11. The system according to claim 10, wherein:
the third coupling element has an attachment element on a side of the third coupling element opposite the one or more plug connection elements for the plug connection to the second coupling element for the releasable attachment of the third coupling element to a further attachment element, wherein the further attachment element can be attached to a material deposition processing apparatus that can be received at the tool support of the work spindle of the spindle apparatus.

12. The system according to claim 1, wherein:
the system further comprises the tool interface unit including the receiver coil unit.

13. The system according to claim 12, wherein:
the tool interface unit also has a tool support portion on a side of the tool interface unit opposite the tool interface portion in order to receive a tool.

14. The system according to claim 12, wherein:
the electrical load of the tool interface unit is configured to drive an oscillation within the ultrasonic frequency range.

15. A system for use with a spindle apparatus of a machine tool, comprising:
an energy transmission unit having a transmitter coil unit for contact-free transmission of electrical energy to a receiver coil unit of a tool interface unit, the tool interface unit including:
the receiver coil unit;
an electrical load; and
a tool interface portion configured to be received by a tool support of a work spindle of the spindle apparatus, and
the system further comprising:
a coupling interface unit having an interface body element configured to be attached to the spindle apparatus;
wherein the coupling interface unit includes a second coupling element configured to be releasably coupled to a first coupling element of the energy transmission unit,
wherein the coupling interface unit has an electrically, hydraulically or pneumatically controllable locking mechanism for unlocking and locking the releasable connection between the first and second coupling elements.

16. The system according to claim 15, wherein:
the first and second coupling elements each have one or more plug connection elements such that the one or more plug connection elements of the first coupling element are configured with the one or more plug connection elements of the second coupling element to establish a releasable plug connection for the releasable attachment of the first coupling element to the second coupling element.

17. The system according to claim 15, wherein:
the coupling interface unit has electric, hydraulic or pneumatic connection elements arranged on the interface body element in order to control the locking mechanism.

18. The system according to claim 15, wherein:
the interface body element of the coupling interface unit can be attached to the spindle apparatus by a screw connection.

19. The system according to claim 15, further comprising:
a coupling element holder that can be attached to the machine tool and that has a coupling element support for holding the energy transmission unit when the first coupling element of the energy transmission unit is uncoupled from the second coupling element of the coupling interface unit.

20. The system according to claim 15, further comprising:
a coupling element adapter having a third coupling element, wherein the third coupling element is configured to be coupled by a releasable connection to the second coupling element of the coupling interface unit.

21. The system according to claim 15, wherein:
the system further comprises the tool interface unit including the receiver coil unit.

* * * * *